United States Patent
Sambamoorthy et al.

(10) Patent No.: US 11,907,393 B2
(45) Date of Patent: Feb. 20, 2024

(54) ENRICHED DOCUMENT-SENSITIVITY METADATA USING CONTEXTUAL INFORMATION

(71) Applicant: Netskope, Inc., Santa Clara, CA (US)

(72) Inventors: Arjun Sambamoorthy, Mountain View, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/878,781

(22) Filed: Aug. 1, 2022

(65) Prior Publication Data

US 2023/0078586 A1 Mar. 16, 2023

Related U.S. Application Data

(63) Continuation of application No. 16/118,278, filed on Aug. 30, 2018, now Pat. No. 11,403,418.

(51) Int. Cl.
*G06F 21/62* (2013.01)
*G06F 9/54* (2006.01)
(Continued)

(52) U.S. Cl.
CPC .......... *G06F 21/6227* (2013.01); *G06F 9/547* (2013.01); *G06F 16/285* (2019.01); *G06F 16/93* (2019.01)

(58) Field of Classification Search
CPC .... G06F 21/6227; G06F 16/285; G06F 16/93; G06F 9/547
See application file for complete search history.

(56) References Cited

U.S. PATENT DOCUMENTS 5,880,740 A * 3/1999 Halliday ................. G06T 11/60
                                                           345/629
6,574,655 B1    6/2003 Libert et al.
(Continued)

FOREIGN PATENT DOCUMENTS

CA          1282178 C  *  3/1991  ....... G06F 17/30017
CN        103441855 B  *  7/2016
(Continued)

OTHER PUBLICATIONS

Netskope Context-Aware Information Rights Management Program Provides Protection That Follows the Data, Netscope (Year: 2017).*
(Continued)

*Primary Examiner* — Richard A McCoy
(74) *Attorney, Agent, or Firm* — Haynes Beffel & Wolfeld LLP; Ernest J. Beffel, Jr.; Jason Liao

(57) ABSTRACT

The technology disclosed includes a system to efficiently classify sensitivity of document generated by and downloaded from cloud-based provider services. The system monitors network traffic at a document-generation initiating endpoint and receives a web page identifying the document generated. The system parses the network traffic that selects the document for download, based on the user selecting a link, and intercepts a document handle in an API parameter string used to download the document. The system interprets the document handle to analyze sensitivity of the document to assign a sensitive classification to the document. The sensitivity classification is encoded into the document header metadata. The encoded sensitivity classification can be used to enhance security, for example, preventing data exfiltration.

22 Claims, 15 Drawing Sheets

(51) Int. Cl.
*G06F 16/93* (2019.01)
*G06F 16/28* (2019.01)

(56) References Cited

U.S. PATENT DOCUMENTS

| | | | |
|---|---|---|---|
| 7,152,116 B1* | 12/2006 | Austin | H04L 61/30 |
| | | | 709/245 |
| 7,272,646 B2 | 9/2007 | Cooper et al. | |
| 7,478,434 B1 | 1/2009 | Hinton et al. | |
| 7,958,147 B1 | 6/2011 | Turner et al. | |
| 7,987,494 B1* | 7/2011 | Donahue | H04N 1/32128 |
| | | | 283/73 |
| 7,996,373 B1 | 8/2011 | Zoppas et al. | |
| 8,073,255 B2 | 12/2011 | Nishikawa | |
| 8,127,365 B1 | 2/2012 | Liu et al. | |
| 8,130,747 B2 | 3/2012 | Li et al. | |
| 8,291,500 B1* | 10/2012 | Bojaxhi | G06F 21/552 |
| | | | 713/188 |
| 8,365,243 B1 | 1/2013 | Lu et al. | |
| 8,438,630 B1 | 5/2013 | Clifford | |
| 8,544,060 B1 | 9/2013 | Khetawat | |
| 8,572,757 B1 | 10/2013 | Stamos et al. | |
| 8,572,758 B1 | 10/2013 | Clifford | |
| 8,578,485 B2 | 11/2013 | Yu | |
| 8,613,040 B2 | 12/2013 | Barile | |
| 8,763,072 B2 | 6/2014 | Agrawal | |
| 8,776,249 B1 | 7/2014 | Margolin | |
| 8,856,869 B1 | 10/2014 | Brinskelle | |
| 8,914,892 B2 | 12/2014 | Karande et al. | |
| 9,002,909 B2 | 4/2015 | Hockey | |
| 9,069,992 B1 | 6/2015 | Vaikar et al. | |
| 9,098,459 B2 | 8/2015 | Davis et al. | |
| 9,137,131 B1 | 9/2015 | Sarukkai et al. | |
| 9,230,096 B2 | 1/2016 | Sarin et al. | |
| 9,246,948 B2 | 1/2016 | Jaiswal et al. | |
| 9,256,727 B1 | 2/2016 | Manmohan | |
| 9,286,301 B2 | 3/2016 | Motoyama | |
| 9,350,735 B1 | 5/2016 | Parmar et al. | |
| 9,418,232 B1 | 8/2016 | Khetawat et al. | |
| 9,477,756 B1* | 10/2016 | Park | G06F 16/353 |
| 9,547,712 B2 | 1/2017 | Kraley | |
| 9,565,202 B1 | 2/2017 | Kindlund et al. | |
| 9,619,649 B1 | 4/2017 | Yun | |
| 9,626,528 B2 | 4/2017 | Butler | |
| 9,692,759 B1 | 6/2017 | Chandrasekhar | |
| 9,697,349 B2 | 7/2017 | Li et al. | |
| 9,716,724 B1 | 7/2017 | Chennuru et al. | |
| 9,917,817 B1 | 3/2018 | Lad et al. | |
| 10,104,052 B2 | 10/2018 | Smith et al. | |
| 10,133,855 B2 | 11/2018 | Stappenbeck et al. | |
| 10,162,767 B2 | 12/2018 | Spurlock et al. | |
| 10,169,342 B1* | 1/2019 | Ben-Yair | G06F 16/9538 |
| 10,248,797 B1 | 4/2019 | Shinde et al. | |
| 10,291,657 B2 | 5/2019 | Narayanaswamy et al. | |
| 10,349,304 B2 | 7/2019 | Kim et al. | |
| 10,462,116 B1* | 10/2019 | Sharifi Mehr | H04L 63/062 |
| 10,462,165 B1 | 10/2019 | Salour | |
| 10,594,730 B1 | 3/2020 | Summers et al. | |
| 10,757,090 B2 | 8/2020 | Kahol et al. | |
| 10,783,447 B2 | 9/2020 | Kochura et al. | |
| 10,803,188 B1 | 10/2020 | Rajput et al. | |
| 10,812,531 B2 | 10/2020 | Narayanaswamy et al. | |
| 10,826,940 B2 | 11/2020 | Narayanaswamy et al. | |
| 10,855,671 B2 | 12/2020 | Kahol et al. | |
| 11,064,013 B2 | 7/2021 | Cheng et al. | |
| 11,120,293 B1* | 9/2021 | Rosenzweig | G06T 7/215 |
| 2002/0194337 A1* | 12/2002 | Knight | G06F 21/6209 |
| | | | 709/225 |
| 2003/0135465 A1 | 7/2003 | Lee et al. | |
| 2004/0179687 A1* | 9/2004 | Lai | H04W 12/033 |
| | | | 380/247 |
| 2004/0205360 A1 | 10/2004 | Norton et al. | |
| 2005/0289354 A1 | 12/2005 | Borthakur et al. | |
| 2006/0044605 A1* | 3/2006 | Schneider | G06V 30/1448 |
| | | | 358/1.15 |
| 2006/0075481 A1 | 4/2006 | Ross et al. | |
| 2006/0117016 A1* | 6/2006 | Smith | G06F 21/62 |
| | | | 707/999.009 |
| 2006/0259948 A1* | 11/2006 | Calow | G06F 21/6218 |
| | | | 726/1 |
| 2007/0006293 A1 | 1/2007 | Balakrishnan et al. | |
| 2007/0039018 A1 | 2/2007 | Saslow | |
| 2008/0104118 A1 | 5/2008 | Pulfer et al. | |
| 2008/0127303 A1 | 5/2008 | Wrighton et al. | |
| 2008/0189778 A1 | 8/2008 | Rowley | |
| 2008/0216174 A1 | 9/2008 | Vogel et al. | |
| 2009/0022319 A1 | 1/2009 | Shahaf et al. | |
| 2009/0044260 A1 | 2/2009 | Niglio et al. | |
| 2009/0172162 A1 | 7/2009 | Wood | |
| 2009/0232300 A1 | 9/2009 | Zucker et al. | |
| 2009/0296926 A1 | 12/2009 | Perlman | |
| 2010/0128290 A1* | 5/2010 | Fan | B42D 25/29 |
| | | | 358/1.9 |
| 2010/0146269 A1 | 6/2010 | Baskaran | |
| 2011/0047590 A1 | 2/2011 | Carr et al. | |
| 2011/0131408 A1 | 6/2011 | Cook et al. | |
| 2011/0219424 A1 | 9/2011 | Panasyuk et al. | |
| 2011/0219451 A1 | 9/2011 | McDougal et al. | |
| 2011/0264906 A1 | 10/2011 | Pourzandi et al. | |
| 2011/0277027 A1 | 11/2011 | Hayton et al. | |
| 2012/0008786 A1 | 1/2012 | Cronk et al. | |
| 2012/0023323 A1 | 1/2012 | Kent, Jr. et al. | |
| 2012/0106366 A1 | 5/2012 | Gauvin | |
| 2012/0144189 A1 | 6/2012 | Zhong | |
| 2012/0151551 A1 | 6/2012 | Readshaw et al. | |
| 2012/0204260 A1 | 8/2012 | Cecil et al. | |
| 2012/0278872 A1 | 11/2012 | Woelfel et al. | |
| 2012/0297457 A1* | 11/2012 | Schulte | H04L 65/1069 |
| | | | 726/4 |
| 2013/0006865 A1 | 1/2013 | Spates | |
| 2013/0024942 A1 | 1/2013 | Wiegenstein et al. | |
| 2013/0031097 A1* | 1/2013 | Sutter | G06F 16/313 |
| | | | 707/737 |
| 2013/0055342 A1 | 2/2013 | Choi et al. | |
| 2013/0117845 A1* | 5/2013 | Kerschbaumer | G06F 21/6227 |
| | | | 726/22 |
| 2013/0151988 A1* | 6/2013 | Sorin | H04W 4/21 |
| | | | 715/753 |
| 2013/0282737 A1* | 10/2013 | Chen | H04L 67/02 |
| | | | 707/749 |
| 2013/0297749 A1* | 11/2013 | Zhang | H04L 67/06 |
| | | | 709/219 |
| 2014/0007182 A1 | 1/2014 | Qureshi et al. | |
| 2014/0007222 A1 | 1/2014 | Qureshi et al. | |
| 2014/0026182 A1 | 1/2014 | Pearl et al. | |
| 2014/0106787 A1* | 4/2014 | Hangai | H04M 1/72463 |
| | | | 455/566 |
| 2014/0259190 A1 | 9/2014 | Kiang et al. | |
| 2014/0310392 A1 | 10/2014 | Ho | |
| 2014/0379758 A1* | 12/2014 | Kim | G07C 5/085 |
| | | | 707/812 |
| 2015/0019870 A1 | 1/2015 | Patnala et al. | |
| 2015/0074744 A1 | 3/2015 | McLean et al. | |
| 2015/0100357 A1 | 4/2015 | Seese et al. | |
| 2015/0135302 A1 | 5/2015 | Cohen et al. | |
| 2015/0142986 A1 | 5/2015 | Reznik et al. | |
| 2015/0146262 A1* | 5/2015 | Fan | H04N 1/32309 |
| | | | 358/3.28 |
| 2015/0150129 A1* | 5/2015 | Giura | H04L 51/212 |
| | | | 726/23 |
| 2015/0200924 A1 | 7/2015 | Parla et al. | |
| 2015/0254469 A1 | 9/2015 | Butler | |
| 2015/0271207 A1 | 9/2015 | Jaiswal et al. | |
| 2015/0312227 A1 | 10/2015 | Follis et al. | |
| 2015/0319156 A1 | 11/2015 | Guccione et al. | |
| 2015/0372904 A1* | 12/2015 | Navon | H04L 47/2475 |
| | | | 709/238 |
| 2016/0044035 A1 | 2/2016 | Huang | |
| 2016/0087970 A1 | 3/2016 | Kahol et al. | |
| 2016/0094483 A1 | 3/2016 | Johnston et al. | |
| 2016/0142647 A1 | 5/2016 | Gopinath et al. | |
| 2016/0269467 A1 | 9/2016 | Lee et al. | |
| 2016/0275577 A1 | 9/2016 | Kolluri Venkata Sesha et al. | |

(56) References Cited

U.S. PATENT DOCUMENTS

| | | | |
|---|---|---|---|
| 2016/0277374 | A1 | 9/2016 | Reid et al. |
| 2016/0285918 | A1 | 9/2016 | Peretz et al. |
| 2016/0292445 | A1 | 10/2016 | Lindemann |
| 2017/0063720 | A1 | 3/2017 | Foskett et al. |
| 2017/0091482 | A1 | 3/2017 | Sarin et al. |
| 2017/0118282 | A1* | 4/2017 | Lee .................. H04L 67/1097 |
| 2017/0142144 | A1* | 5/2017 | Weinberger ......... H04L 63/1408 |
| 2017/0192940 | A1 | 7/2017 | Ghatage et al. |
| 2017/0264640 | A1 | 9/2017 | Narayanaswamy et al. |
| 2017/0353496 | A1 | 12/2017 | Pai et al. |
| 2018/0018463 | A1* | 1/2018 | Grossman .............. A63F 13/75 |
| 2018/0034837 | A1 | 2/2018 | Lakhani et al. |
| 2018/0063182 | A1 | 3/2018 | Jones et al. |
| 2018/0219881 | A1* | 8/2018 | Kayacik .............. G06F 21/552 |
| 2018/0324204 | A1 | 11/2018 | McClory et al. |
| 2019/0180048 | A1 | 6/2019 | Koduri et al. |
| 2020/0372040 | A1 | 11/2020 | Boehmann et al. |
| 2021/0367976 | A1 | 11/2021 | Khurshid et al. |

FOREIGN PATENT DOCUMENTS

| | | | | |
|---|---|---|---|---|
| DE | 102009058438 | A1 * | 6/2011 | ......... G07D 11/0084 |
| EP | 2544117 | A1 | 1/2013 | |
| JP | 2006522388 | A * | 9/2008 | |
| JP | 2012084141 | A | 4/2012 | |
| JP | 2015130112 | A | 7/2015 | |
| RU | 2398274 | C2 * | 8/2010 | ............. G06F 16/30 |
| WO | 2007009255 | A1 | 1/2007 | |
| WO | 2012058487 | A2 | 5/2012 | |
| WO | 2014141045 | A1 | 9/2014 | |
| WO | 2015002875 | A1 | 1/2015 | |
| WO | 2019226363 | A1 | 11/2019 | |

OTHER PUBLICATIONS

Symantec, Symanlec Data Loss Prevention for Endpoint, dated May 2011, 3 pages.

"Netskope Introspeclion," netSkope, Inc., 2015, 3 pgs.

Netskope, Inc., "Netskope ActiveTM Cloud DLP," 2015, pp. 1-5.

Netskope, Inc., "Data Loss Prevention and Monitoring in the Cloud," Nov. 2014, pp. 1-18.

Netskope, Inc., "The 5 Steps to Cloud Confidence", 2014, pp. 1-11.

Netskope, Inc., "Repave the Cloud-Data Breach Collision Course," 2014, pp. 1-6.

Netskope, Inc., "Netskope Cloud Confidence IndexTM," 2015, pp. 1-4.

Office 365 Team, "Office 365—Our Latest Innovations in Security and Compliance," Microsoft Inc., Oct. 28, 2014, 6 pages, Retrieved from the Internet: <http://blogs.office.com/2014/10/28/office-365-latest-innovations-security-compliance/> [Apr. 10, 2015].

Axway, Comprehensive API and SOA 1-25 Security, Mar. 18, 2015, XP055310645, 3 Pages, Retrieved from the Internet: http://www.axway.com/sites/default/files/brief_files/axway_solutionbrief_api_soa security_en.pdf>.

Akana, "API Security: A Guide To Securing Your Digital Channels", Mar. 15, 2015, XP055312513, Sections 2 and 3, Retrieved from the Internet: <http://resource.akana.com/white-papers/api-security-a-guide-to-securing-your-digital-channels.

Akana, "API Gateway: Key Security Features", Mar. 10, 2015, 2 pages, XP055312562, Retrieved from the Internet: http://resource.akana.com/datasheets/api-gateway-security-features.

Berg et al., "Issue Sep./Oct. API Governance and Management By Longji Tang, Mark Little LXXXVI Security and Identity Management Applied to SOA -Part II A Look at Service-Driven Industry Models Contents", Service Technology Magazine, Sep. 1, 2014, pp. 1-45, XP055243185, Retrieved from the Internet: URL:http://servicetechmag.com/system/application/views/186/ServiceTechMag.com_Issue86_online.pdf.

Laminin Solutions: "Metadata Permissions Protects Confidential Information", Feb. 19, 2013, pp. 1-2 XP002770913.

Yague et al., "A Metadata-based access control model for web services", Computer Science Department, Internet Research, vol. 15, No. 1, University of Malaga, Malaga, Spain, Dec. 31, 2005, pp. 99-116, XP002770914.

Gowadia et al., "RDF Metadata for XML Access Control", Proceedings of the ACM Workshop on XML Security 2003. Fairfax, VA, Oct. 31, 2003, pp. 39-48, XP001198168.

Kuwabara et al., "Use of Metadata for Access Control and Version Management in RDF Database", Sep. 12, 2011, Knowledge-Based and Intelligent Information and Engineering Systems, Springer Berling Heidelberg, pp. 326-336, XP019164752.

Kark et al., "Trends: Calculating the Cost of a Security Breach", Forrester Research, Inc. Apr. 10, 2007, 7 pgs.

"Data Breach: The Cloud Multiplier Effect", Ponemon Institute, Jun. 4, 2014, 27 pages.

Riley et al., "Magic Quadrant for Cloud Access Security Brokers", Nov. 30, 2017, 28 pages, downloaded from-https://go.netskope.com/typ-gartner-mq-for-casb.html.

Lakshman et al., "Cassandra-A Decentralized Structured Storage System", 2009, 6 pages.

DeCandia et al., "Dynamo: Amazon's Highly Available Key-value Store", SOSP '07, Oct. 14-17, 2007, 16 pages.

Chang et al., "Bigtable: A Distributed Storage System for Structured Data", Operating Systems Design and Implementation, OSDI, 2006, 14 pages.

Sumit Khurana, et al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.

Li et al., Security Intelligence—A Practitioner's Guide to Solving Enterprise Security Challenges, Wiley publications, dated 2015, 363 pages.

Li et al., Security Intelligence—A Practitioner's Guide to Solving Enterprise Security Challenges, Wiley, dated 2015, 363 pages.

McAfee, McAfee Data Loss Prevention Endpoint, dated May 2017, 3 pages.

Symantec, Symantec Data Loss Prevention for Endpoint, dated May 2011, 3 pages.

Baron et al., AWS certified Solutions Architect—Official Study Guide, Amazon Web Services, Wiley & Sons publication, dated 2017, 517 pages.

"Netskope Introspection," netSkope, Inc., 2015, 3 pgs.

* cited by examiner

400A

| netskope | Dashboard | Analytics | Introspection | Policies | Skope IT™ | Cloud Confidence Index | Reports | ⚙ ⊙ ⊗ |

EVENTS  ALERTS  QUARANTINE  LEGAL HOLD  THREAT PROTECTION  INCIDENT MANAGEMENT

☐ Hide Alerts

Application Events ▾

Last 30 days ▾    🔍 app eq Salesforce.com    ✕    Search    ⊙

APPLICATION EVENTS (14,008,739)

| ⬆ Time | User Location | App Location | User | Application | Activity | Variable | Value |
|---|---|---|---|---|---|---|---|
| General 431 | | User 433 | | Application 435 | | Destination 439 | |

Type  nspolicy
Alert Generated  no
Timestamp(UTC)  01/19/2018, 21:05:02
Local Source Time  01/19/2018, 15:05:02
Access Method  Client
Traffic Type  CloudApp
Browser Version  63.0.3239.132
Browser Session Id  4148705302180765...
Page Site  Salesforce.com
Managed App  yes
Transaction Id  11306212828509144333
Dst Timezone  America/Los_Angeles
Md5  1176a511e59ec515d50e8a2da7c96...
Page Id  31341993856313107337

User  mrefakis@netskope.com
IP  172.20.10.6
Device  Mac Device
OS  Sierra
Browser  Chrome
OU
Device Classification  managed
Host Name  Mikeas MacBook Air
OS Version  Sierra
User Key  mrefakis@netskope.com Application  X Salesforce.com:Corp Inst...
Instance ID  oid=00D6000000KXmt pid...
URL  netskope--c.na67.content.force.co...
CCL  excellent
CCI  92
Activity  Download
Page  netskope.my.salesforce.com/
Object  "Purchase Order_PO-44000079...
Object Id  00P60000013hYa  455
Object Type  File
Telemetry App
AppSession ID  4448016018133549123
Referer  https://netskope.my.salesforce.c...
Category  Customer Relationship Manag...

Source 437
IP  70.5.8.95
Location  Dallas
Region  Texas
Country  US
Zip  75227
Latitude  32.7732009888
Longitude  -96.6850967407
Timezone  America/Chicago Destination 439
IP  136.147.110.112
Location  San Francisco
Region  California
Country  US
Zip  94105
Latitude  37.7897987366
Longitude  -122.394203186

| General | Summary | Statistics | Contents | Custom |

Name:

Checked by
Client
Date completed
Department
Destination

Add

Delete

Type: Text

Value: ☐ Link to content

Properties:

| Name | Value | Type |
|---|---|---|
| NTSKP-LANGUAGE | English | Text |
| NTSKP-CLASSIFICATION | Restricted | Text |

565

OK

Cancel

800

```
<resource name="downloadsfileinapi" patch= "/services/data/.+/sobjects/
                ContentVersion{object_id}/VersionData">
                                  ⎵
    <id>                         815
      <and>
        <match field="uri" mtype= "strstr" rhs ="VersionData" />
        <match field="method" key= "httpmethods" mtype= "nsdef"
                        rhs ="VersionData" />
      </and>
    </id>
    <request>
      <actions>
        <and>
          <match field="method" key= "httpmethods" mtype= "nsdef" rhs ="get" />
        </and>        ⎴ 834          ⎴ 837
          <assign lhs="object_type" order= "1" rhs= "File" type ="value" />
          <assign lhsvar="tmp" order= "1" rhs= "7645" type ="value" />
          <trigger name="Download" order="2">
            <external>
              <action_name= "nspolicy_lookup" />
            </external>
              <var name= "from_user" />
              <var name= "instance_id" />
              <var name= "object_type" />
              <var name= "object_id" />
          </trigger>
      </actions>
    </request>
    <response>
      <actions>
        <and>
          <match field="status" key= "http_statuscode" mtype= "nsdef" rhs ="ok" />
          <match lhsvar="tmp" myupe= "eq" rhs= "7645" />
        </and>
          <assign lhsvar="tmp" order= "1" rhs= "0" type ="value" />
          <trigger endprocessing="y" name= "Download" order="2">
            <external>                    ⎵
              <action_name= "inspect_rsp" />  866
              <action_name= "send_event" />
            </external>
              <var name= "from_user" />
              <var name= "object_type" />
              <var name= "object" />
          </trigger>
      </actions>
    </response>
</resource>
```

841 — `<request>` block
871 — `<response>` block

FIG. 8

ENRICHED DOCUMENT-SENSITIVITY METADATA USING CONTEXTUAL INFORMATION

CROSS-REFERENCE

This application is a continuation of U.S. application Ser. No. 16/118,278, titled "Enriching Document Metadata Using Contextual Information", filed 30 Aug. 2018, now U.S. Pat. No. 11,403,418, issued 2 Aug. 2022.

INCORPORATIONS

The following materials are incorporated by reference as if fully set forth herein:

U.S. Nonprovisional patent application Ser. No. 14/198,499, entitled "SECURITY FOR NETWORK DELIVERED SERVICES", filed on Mar. 5, 2014 (now U.S. Pat. No. 9,398,102 issued on Jul. 19, 2016);

U.S. Nonprovisional patent application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015;

U.S. Nonprovisional patent application Ser. No. 15/368,240, entitled "SYSTEMS AND METHODS OF ENFORCING MULTI-PART POLICIES ON DATA-DEFICIENT TRANSACTIONS OF CLOUD COMPUTING SERVICES", filed on Dec. 2, 2016;

U.S. Nonprovisional patent application Ser. No. 15/911,034, entitled "SIMULATION AND VISUALIZATION OF MALWARE SPREAD IN A CLOUD-BASED COLLABORATION ENVIRONMENT", filed on Mar. 2, 2018; and U.S. Provisional Patent Application No. 62/488,703, entitled "REDUCING LATENCY AND ERROR IN SECURITY ENFORCEMENT BY A NETWORK SECURITY SYSTEM (NSS)", filed on Apr. 21, 2017;

"Data Loss Prevention and Monitoring in the Cloud" by netSkope, Inc.;

"The 5 Steps to Cloud Confidence" by netSkope, Inc.;

"Netskope Active Cloud DLP" by netSkope, Inc.;

"Repave the Cloud-Data Breach Collision Course" by netSkope, Inc.; and

"Netskope Cloud Confidence Index™" by netSkope, Inc.

FIELD OF THE TECHNOLOGY DISCLOSED

The technology disclosed relates to efficiently classifying sensitivity of document generated by and downloaded from cloud-based provider services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for a number of corporate functions is now common. Thus, instead of installing servers within a corporate network to run a customer relationship management (CRM) software product, a software as a service (SaaS) solution such as Salesforce.com's offerings can be used. The information technology (IT) and network architecture approaches that could log and protect access to a classic solution provide limited control.

Data is often the lifeblood of any business and it is critical that it is effectively managed, protected, and meets compliance needs. Protecting data in the past was focused primarily on on-premise scenarios, but now with the increased adoption of cloud services, companies of all sizes are now relying on the cloud to create, edit, and store data. This presents new challenges. Despite its benefits, the cloud also makes it easy for people to lose sensitive corporate data. For one thing, people can access cloud services from multiple devices more easily. Another is that the cloud services make it easy to share data, including with people outside of an organization. For these reasons, it is easy for data to get out of an organization's control.

Also, as the number of cloud services increases exponentially, there are hundreds of ways data can leak. Employees might be attach a wrong file while sending emails, hit the send button too early, not be careful when rushing to a deadline, or share data and collaborate with people outside of their organization. The native cloud storage sync clients also pose a significant risk to organizations. A continuous sync takes place between the end point and the cloud service without employees realizing they are leaking confidential company information.

An opportunity arises to provide consistent, centrally administered control, e.g. enforce the same policy across multiple devices, network services, and networks—including corporate networks to protect sensitive information such as intellectual property, non-public financials, strategic plans, customer lists, personally identifiable information belonging to customers or employees, and the like.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 4A, 4B, 4C, and 4D present examples of metadata fields extracted by the network security system while the document is in transit from a cloud-based provider service to the requesting enterprise user.

FIG. 5 is an illustration of sensitive classification embedded in the document header.

FIG. 8 is a portion of a computer program code used by the network security system of FIG. 1 to extract metadata fields of example presented in FIG. 4A.

DETAILED DESCRIPTION

Figure 1:
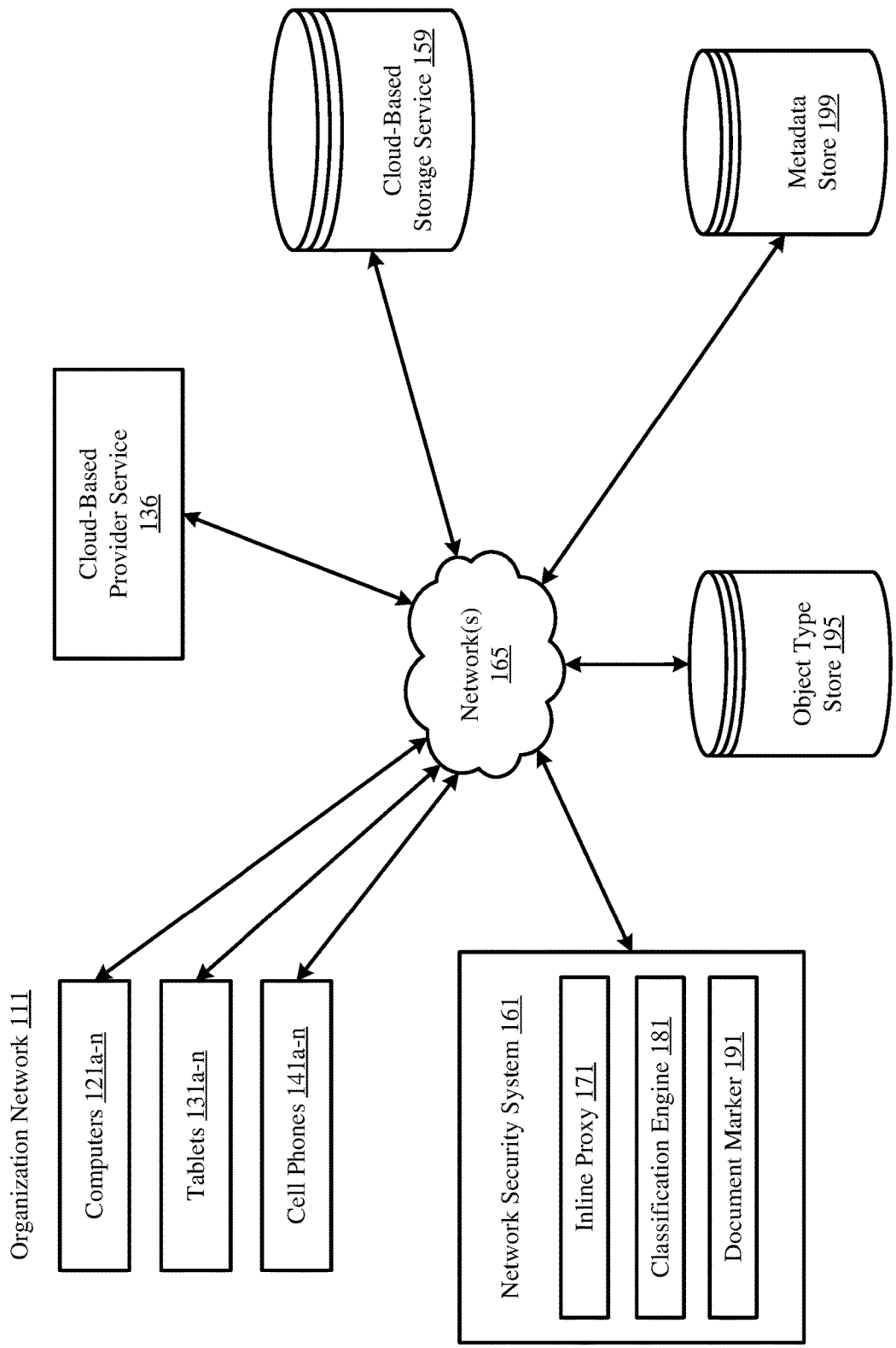
FIG. 1 shows aspects of a system that implements efficient sensitivity classification of documents from cloud-based provider services requested by an enterprise user belonging to an organization network.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

Cloud-based provider services (e.g., Salesforce.com™, ServiceNow™, Oracle on Demand™) allow enterprise users with appropriate credentials to generate documents containing sensitive information. The enterprise users can also download these documents to their respective endpoint routing clients such as a computer or a mobile device. Once downloaded to a computer, the document may not be subject to fine grained security controls of the cloud-based provider service. This can lead to a loss of sensitive information contained in the downloaded document.

To prevent exfiltration of documents containing sensitive information, a first solution approach is to review contents of the document and apply a policy to determine if the document contains sensitive information. This approach requires a considerable amount of processing, causing latencies and degrading user experience. To avoid these issues, the technology disclosed uses an efficient solution approach for sensitivity classification of documents generated by different cloud-based provider services.

The technology disclosed monitors a stream of transaction data between a document downloader (such as an enterprise user) and a document generator (such as a cloud-based provider service) to identify relevant signals in the intercepted transaction data. One or more signals in transaction data of the document en route to a requesting enterprise user contain unique information about the context of the document. Examples of transaction data include application programming interface (API) parameter strings and data interchange formats such as JavaScript Object Notation (JSON), Extensible Markup Language (XML), Simple Object Access Protocol (SOAP), and Representational State Transfer (REST). Such signals are part of the transaction data accompanying the document.

The technology disclosed uses deep insight of the architecture of the cloud-based provider service to parse the signals in transaction data and extract critical metadata. In one implementation, the critical metadata is a document handle which is translated to analyze sensitivity of the document. The document handle can be locally or globally unique. In one implementation, a document type embedded in the document handle is used to encode a sensitive classification to the document. In one implementation, the document handle is used to look up a table containing document handles of sensitive documents. A sensitive classification is assigned to the document, if the document handle is present in the look up table.

The technology disclosed embeds the sensitivity classification assigned to the document as a marker to the document en route to the downloader. This enables downstream processes to simply identify sensitivity classification of the document by viewing the marker. Thus, allowing the downstream processes to apply data exfiltration measures when the user attempts to upload the document to a cloud-based storage service (e.g., Box™, Dropbox™ Gmail™) or store a copy the document to a portable storage device.

System Overview

We describe a system and various implementations for efficiently classifying sensitivity of document generated by and downloaded from cloud-based provider services. FIG. 1 shows an architectural level schematic of a system in accordance with an implementation. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes an organization network 111, a cloud-based provider service 136, a cloud-based storage service 159, a metadata store 199, an object type store 195, a network security system 161, and a network(s) 165. The organization network 111 comprises a variety of user endpoints such as computers 121a-n, tablets 131a-n, and cell phones 141a-n. The network security system (NSS) 161 further comprises an inline proxy 171, a classification engine 181, and a document marker 191.

The interconnection of the elements of system 100 will now be described. The network(s) 165, couples the computers 121a-n, the tablets 131a-n, the cell phones 141a-n, the cloud-based provider service 136, the cloud-based storage service 159, the metadata store 199, the object type store 195, and the network security system 161, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

The Cloud-based provider service 136 provides functionality to users that is implemented in the cloud and that is the target of policies, e.g., logging in, generating documents, editing documents and downloading documents. Salesforce.com™, a cloud-based customer relationship management (CRM) system, is an example of a cloud-based provider service 136.

A document refers to a unit of data generated by a cloud-based provider service 136. Examples of documents include reports, messages, and source code. A document is also referred to as a file. Documents can be generated by cloud-based provider services either by a query from a user e.g. "opportunities closed for ACME account in last thirty days", or "quarterly sales for all sales persons". Such reports can also be generated by cloud-based provider service using a pre-defined schedule. An enterprise user with appropriate credentials can view the documents generated by cloud-based provider service. For example, the account manager for ACME account can view the "opportunities closed for ACME account in last thirty days", while a customer services representative in services department may not have appropriate credentials to view this document. Salesforce.com™ implements fine grained access to data using a role hierarchy. Roles within the hierarchy affect access to records and reports. For example, a manager in sales department can access the "quarterly sales targets of all sales persons" report while a sales person cannot view this report.

An example document metadata, identifies an audit log of user interaction with a document. Examples of user interaction include sharing a document with other users, uploading a document to a cloud-based storage service, and downloading a document from a cloud-based provider service. For example, a report downloaded from a Salesforce.com™ org (also referred to an instance) has metadata identifying the org identifier (org id), requesting user identifier (user id), source and destination IP (internet protocol) addresses, an object identifier (object id) uniquely identifying the requested document in the org. The document metadata can be obtained from document inspection. A document can be stored on cloud-based services using different storage schemes that encode the document into smaller or larger units. For instance, a document can be stored using block storage or object storage schemes where the document is broken into fixed-size blocks or objects for storage on cloud infrastructure. In this description, any encoding used by a cloud-based service to store, represent, or reconstruct a document is also considered a document.

The user in the organization network 111 with appropriate credentials use endpoints or devices like the computers 121*a-n*, the tablets 131*a-n*, and the cell phones 141*a-n* to download documents from cloud-based provider services like the cloud-based provider service 136. For example, the account manager for ACME account can download the document "opportunities closed for ACME account in last thirty days" from cloud-based provider service 136 to an endpoint. The users collaborate on documents by uploading the documents to cloud-based storage services (e.g., Box™, Dropbox™, Gmail™) like the cloud-based storage service 159. A document downloaded to a user's endpoint is not subject to security policy defined by cloud-based provider service 136.

Implementations of cloud-based provider service 136 and cloud-based storage service 159 can support both web browser clients (e.g., Salesforce.com™ and Dropbox™ websites) and application clients (e.g., Salesforce.com™ mobile app and Dropbox™ client). Either forms can use URL-based APIs. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code based specification intended to be used as an interface by software components to communicate with each other. An API can include specifications for routines, data structures, object classes, and variables. Basically, an API provides an interface for developers and programmers to access the underlying data, platform capabilities, and features of cloud-based services.

Implementations of the technology disclosed use different types of APIs, including web service APIs such as HTTP or HTTPs based APIs like SOAP, Bulk, XML-RPC and JSON-RPC and REST APIs (e.g., Force.com API™, Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™, Box Content API™, Microsoft Graph™, Dropbox API™, Dropbox API v2™, Dropbox Core API™, Dropbox Core API v2™, Facebook Graph API™, Foursquare API™, Geonames API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, and aggregated-single API like CloudRail™ API.

The network security system (NSS) 161 is interposed between the organization network 111 on one side and cloud-based provider service 136 and cloud-based storage service 159 on the other side. The NSS 161 includes the inline proxy 171 that uses a combination of deep API inspection (DAPII) to monitor cloud traffic traversing the organization network 111 to and from the cloud-based provider service 136 and cloud-based storage service 159.

The inline proxy 171 evaluates the application layer traffic to discover cloud-based services interfacing with the organization network 111. It then uses DAPII to detect cloud transactions in real-time, monitoring a user's network traffic that initiates generation of the document and receives a web page identifying the document generated. The cloud transactions are decomposed to identify the activity being performed and its associated parameters. The inline proxy 171 parses the user's network traffic that selects the document for download and intercepts from the parsed traffic a critical metadata in an API parameter string used to download the document. The inline proxy 171 interprets the critical metadata to analyze sensitivity of the document to assign a sensitive classification to the document. Data exfiltration prevention measures can be triggered upon detection of attempted exfiltration of the document based on the sensitivity classification.

In one implementation, the transactions are represented as JSON files, which identify a structure and format that allows the inline proxy 170 to interpret what actions a user is performing in the cloud-based service as it is happening. So, for example, the inline proxy 170 can detect for an organization that a user A in sales department requested to download a "quarterly sales targets for all sales persons" report at 10 AM in San Francisco, California. The inline proxy 170 identifies details of the source of the document such as the corporate org id of the Salesforce.com™ org (also referred to as an instance) from which the report is downloaded. The inline proxy 170 also identifies details of the user A's endpoint which is the destination of the requested report.

In one implementation, the critical metadata includes a document handle that embeds a document type. The sensitivity classification is assigned to the document directly from the document type extracted from the document handle, without reliance on inspecting contents within a body of the document. The inline proxy 171 extracts the document handle of the document from the transaction data. In the example of a report generated by a corporate org of Salesforce.com™, the document handle is an objectId of a document generated by Salesforce.com™. The classification engine 181 queries the object type store 195 to identify document type of the document. In one implementation, the classification engine uses a prefix of the document handle to identify the source object type of the document. For example, consider a document handle "00P6000000t3hYa", the first three characters "00P" identify that the source object type of this document is "attachment". Thus, determining the document type as "attachment". In one implementation, the object type store 195 is organized per cloud-based provider service 136, identifying the object types using a document handle (or portions of a document handle as described above).

In one implementation, the classification engine 181 assigns the sensitivity classification to the document, directly from the document handle using a lookup table. The classification engine 181 assigns the sensitivity classification to the document without reliance on inspecting contents within a body of the document. Consider the example of Salesforce.com™ attachment document downloaded by a user. The classification engine 181, matches the objectId of the document with a list of sensitive objectIds in a lookup table. If the objectId of the document matches one of the sensitive objectIds in the lookup table, the classification engine assigns a sensitive classification to the document.

The document marker 191, embeds the sensitivity classification in header metadata of the document. Inclusion of the sensitivity classification in the header of the document helps in implementation of a policy by simply looking at the document metadata to identify sensitive classification of the document. Inspecting the content of the document or performing deep API inspection (DAPII) is not required for this purpose. For example, if the user attempts to upload a sensitive document to the cloud-based storage service 159, the inline proxy 171 applies a policy to prevent the upload using the sensitivity classification marker in the document header.

Figure 2:
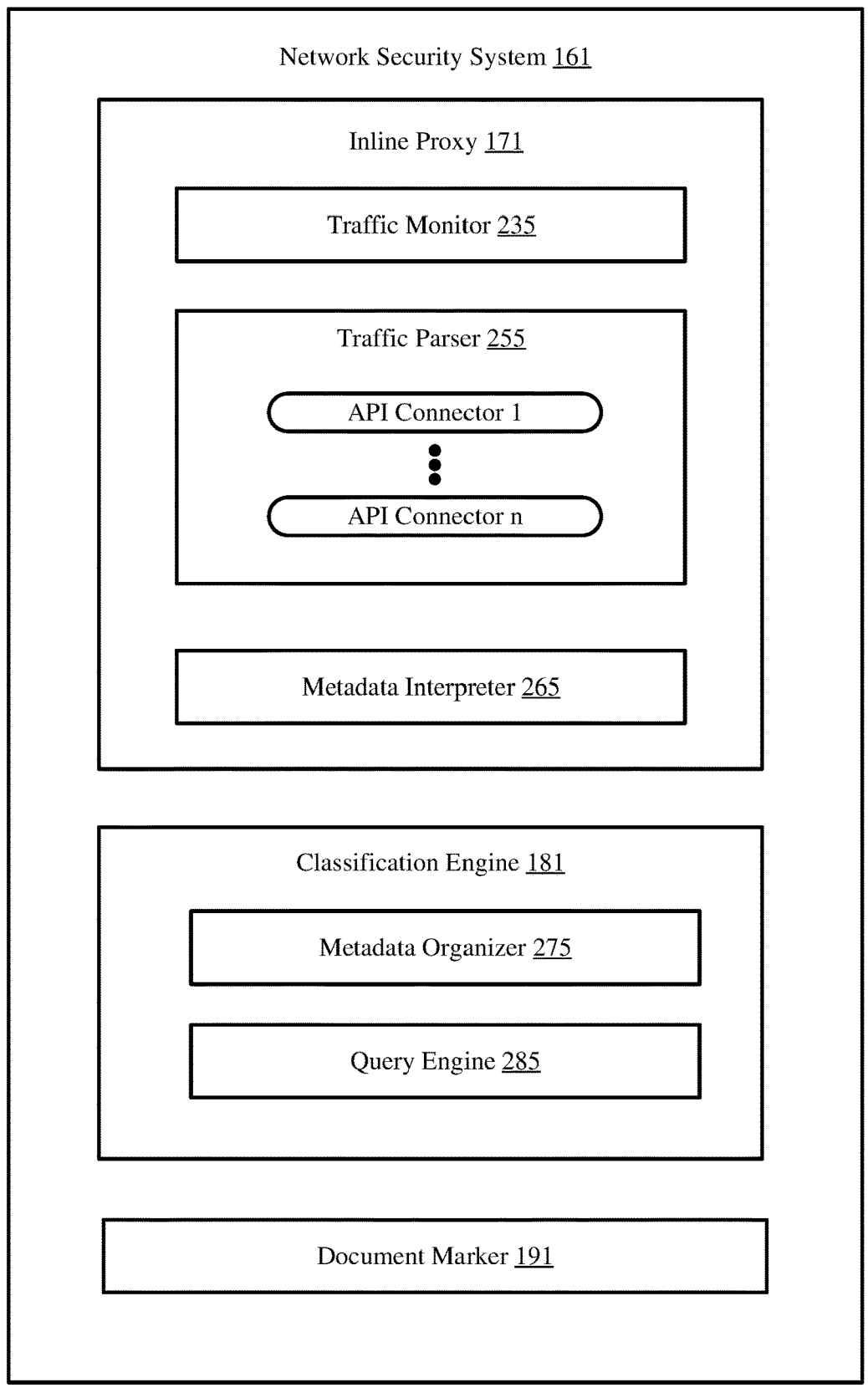
FIG. 2 illustrates subsystem components of the different system components of a network security system shown in FIG. 1.

FIG. 2 is a block diagram 200 illustrating components of the network security system (NSS) 161. The NSS 161 comprises of the inline proxy 171, the classification engine 181, and the document marker 191. The inline proxy 171 further comprises of a traffic monitor 235, a traffic parser 255, and a metadata interpreter 265. The traffic parser 255 comprises of API connectors 1 through n for known cloud-based provider services and cloud-based storage services (also referred to as sanctioned applications). For example, in FIG. 2, API connector 1 can be for Salesforce.com™ and API connector 2 can be for Dropbox™. In other implementations, the traffic parser 255 includes a so-called "universal connector" that serves as a single interface to multiple cloud-based services for which no specific API connector is available. Such cloud-based services are also referred to as "unsanctioned applications".

The traffic monitor 235, monitors transactions between the organization network 111 and the cloud-based services (including the cloud-based provider service 136 and the cloud-based storage service 159). A domain name of the cloud-based service is determined by parsing a uniform resource locator (URL) used to access the API of the cloud-based service. For example, if the domain is "salesforce.com" or "force.com", it matches a sanctioned cloud-based provider service Salesforce.com™. The traffic parser 255 invokes the Salesforce.com™ connector. The Salesforce.com™ connector parses the API string to identify the activity performed in the transaction. Example activities include, "download", "upload", "login attempt", etc. The connectors parses metadata fields to identify parameters of the transaction. As described above, in one implementation, the transaction is represented as a JSON file. Parsing the JSON file, identifies further details of the activity. This includes identification of critical metadata. Examples of the critical metadata include a document handle as described above for the Salesforce.com™ attachment download example, recipient email addresses for documents attached to an email, a true file type of the document etc.

The metadata interpreter 265 identifies a document type using the document handle. In one implementation, the document handle is a concatenated key with a source object type part of the key and an object identifier part of the key that is at least locally unique for the source object type. In the example of Salesforce.com™, a three character prefix of a document handle identifies a source object type in the Salesforce.com™ org. For example, a prefix of "00P" indicates the source object type is "attachment", and "069" indicates the source object type is "ContentDocument". A document of contentdocument object type can be saved in a Salesforce.com™ org without attaching it to a record in a standard object (such as "account", "opportunity", "order") or a custom object created by the administrator of a Salesforce.com™ org. A document of attachment object type is attached to a record of a standard or a custom object type. Thus, it is visible to all users of the org who have access to the record. A document of contentdocument object type is visible only to the user who created it (or cloned it from another document). The user can publish the document to other users in the org. The user can also share the document to external users (such as customers) by creating a content pack and sending it to customers.

The document type identification from the metadata interpreter 265 is given as input to classification engine 181. In one implementation, the classification engine 181, assigns the sensitivity classification to the document directly from a document type interpreted from the document handle. The classification engine 181 does not rely on inspecting contents within a body of the document. In another implementation, the classification engine 181 assigns the sensitivity classification to the document directly from a document type interpreted from the document handle using a lookup table of sensitive document handles. In such an implementation, the classification engine 181 queries the metadata store 199, to determine if the document handle is present in the lookup table. In another implementation, a regular expression is used to match the document handle to identifiers of sensitive documents in the lookup table. The metadata organizer 275 is used to manage metadata store 199 (per cloud-based provider service 136). The classification engine 181 uses a query engine 285 to query the metadata store 199. The document marker 191 embeds the sensitivity classification in header metadata of the document.

Sensitivity Classification of Document from Cloud-based Provider Service

Figure 3A:
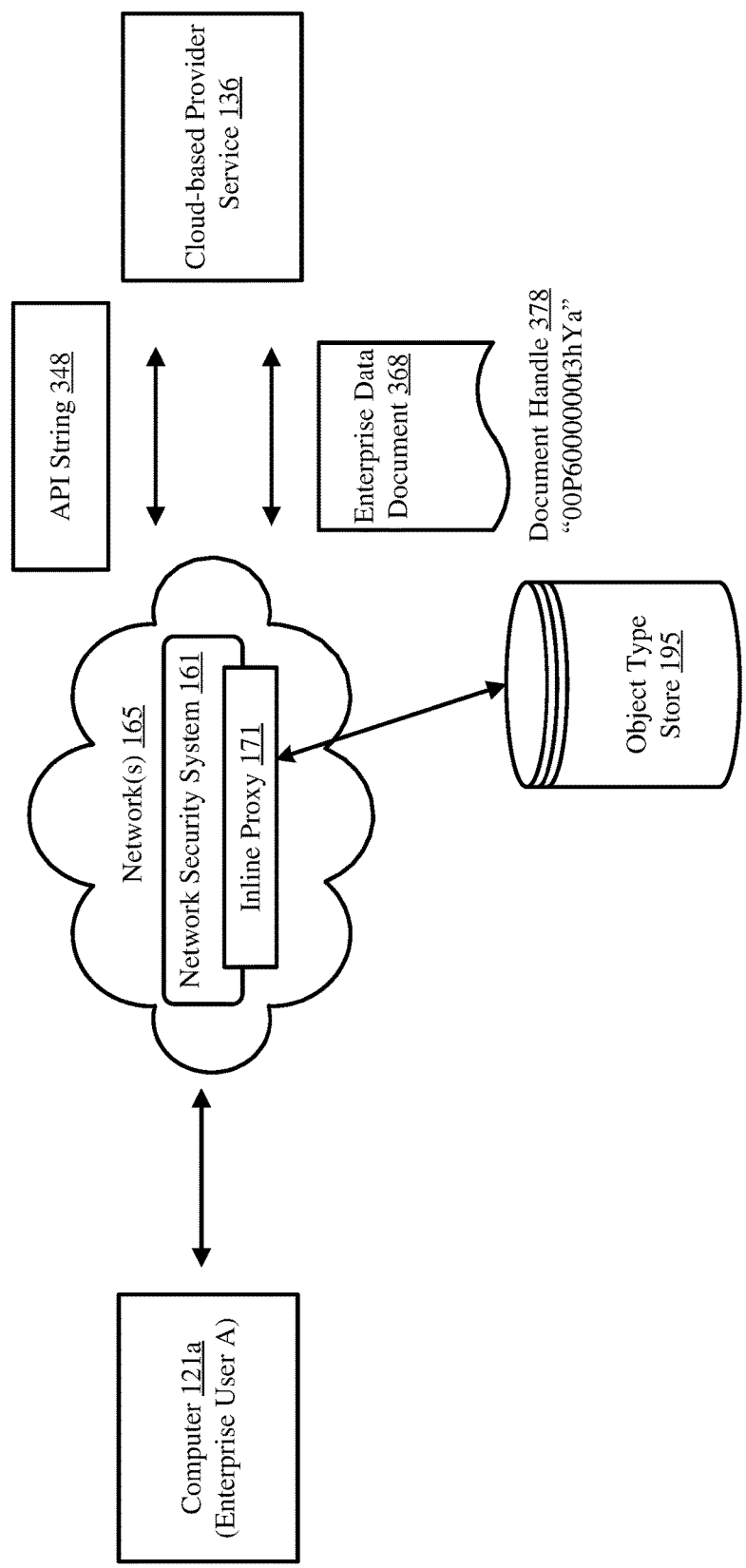
FIG. 3A shows one implementation of an inline proxy monitoring a document download from cloud-based provider service.
Figure 3B:
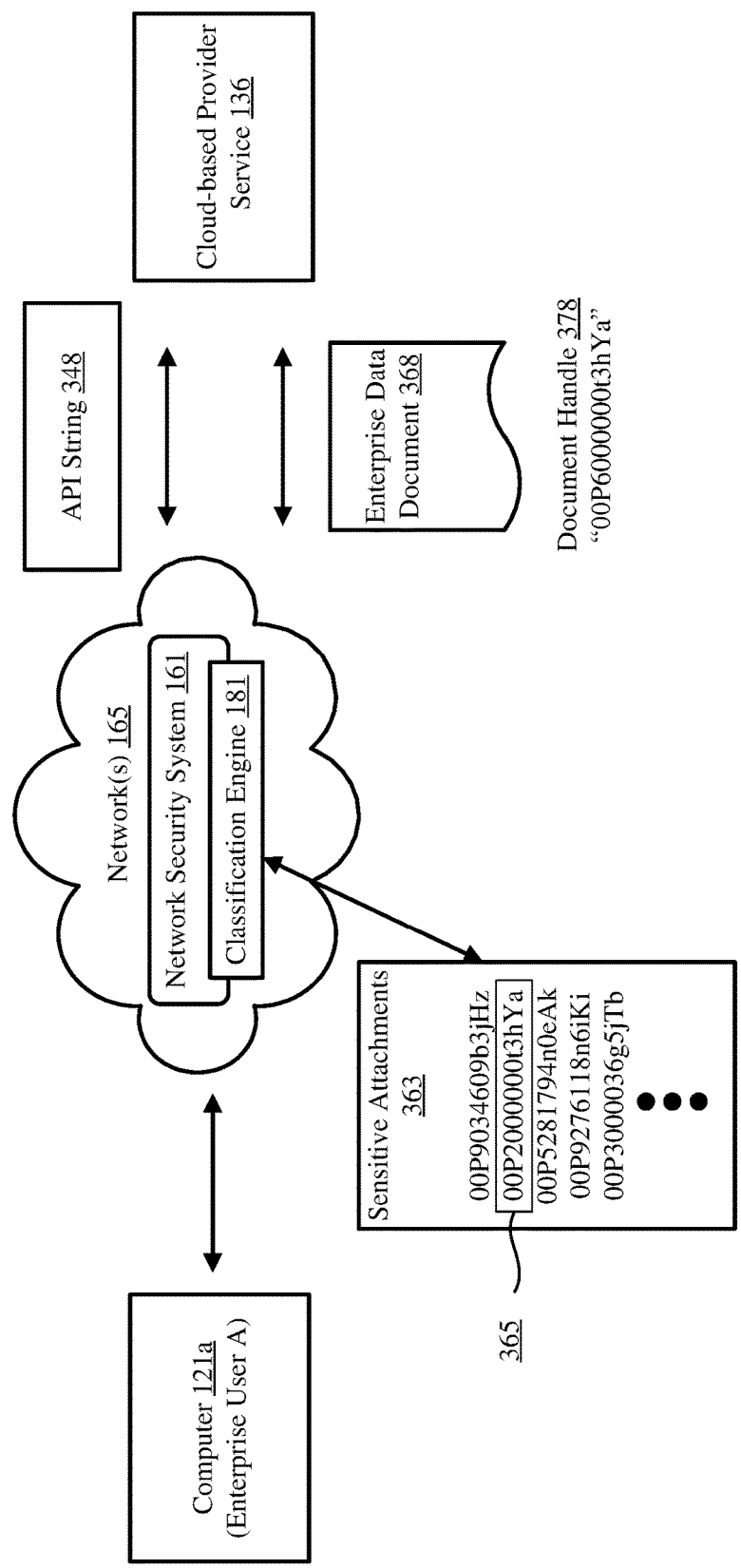
FIG. 3B shows one implementation of a classification engine to analyze sensitivity of the document to assign a sensitive classification to the document shown in FIG. 3A.
Figure 3C:
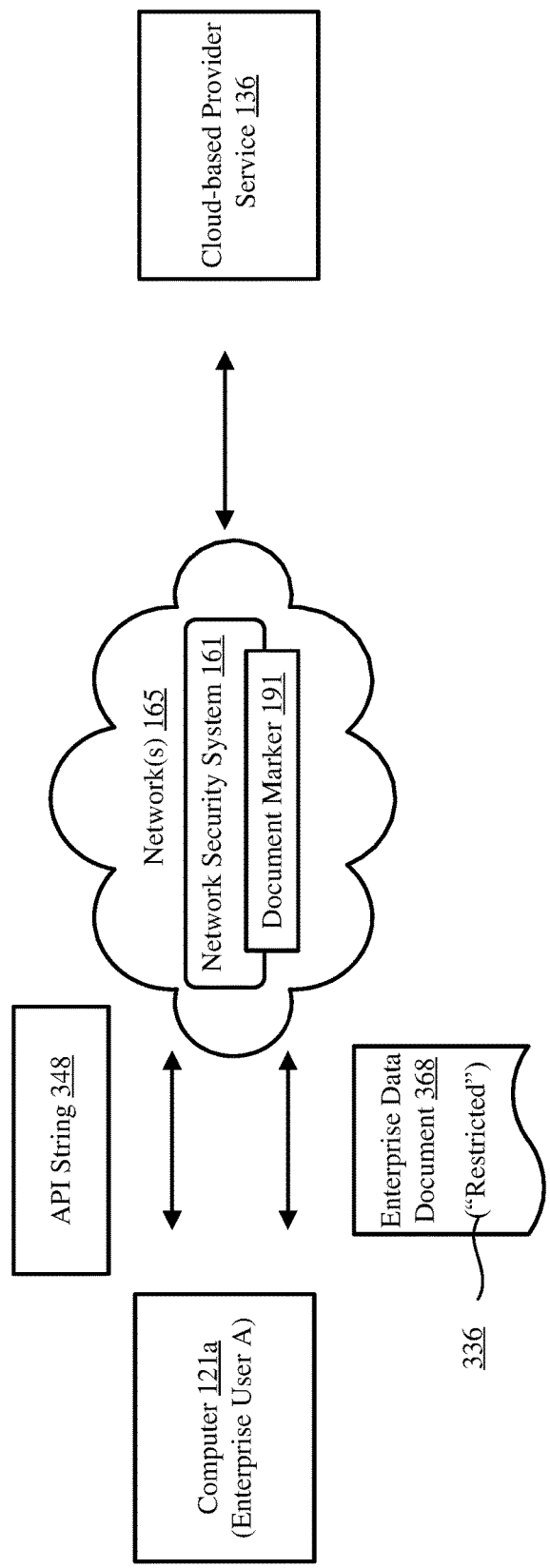
FIG. 3C shows a document marker embedding sensitive classification of the document in the document header.

FIGS. 3A, 3B, and 3C illustrate one implementation of the network security system 161. The analysis performed by the NSS 161 can be implemented at least partially with a computer or other data processing system, e.g., by one or more processors configured to receive or retrieve information, process the information, store results, and transmit the results. Other implementations may perform the results in different orders and/or with different, fewer or additional actions than those illustrated. The inline proxy 171 (in the NSS 161) is interposed between the organization network 111 and the cloud-based services (including the provider service 136 and the storage service 159). The inline proxy 171 monitors web browser traffic from users' endpoints (such as computers 121*a-n*, tablets 131*a-n*, and cell phones 141*a-n*). Upon receiving the request from a user's endpoint, the inline proxy 171 establishes a connection to the server on behalf of the requesting client. Thus, the inline proxy 171 monitors in real time, the request and response messages including any documents downloaded from the cloud-based provider service 136 and uploaded to the cloud-based storage service 159. The inline proxy monitors a user's network traffic that initiates generation of a document by the cloud-based provider service 136 and receives a web page identifying the document generated. In one implementation, the inline proxy 171 is an HTTP (hypertext transfer protocol) proxy, inspecting request and response messages in HTTP transactions.

FIG. 3A illustrates an example response message 300 from the cloud-based provider service 136. Prior to the response message 300 an enterprise user A sends a request message to the cloud-based provider service 136 (via computer 121*a*) to download enterprise data document 368. The inline proxy 171 parses the user's browser traffic that selects the document for download and intercepts critical metadata including a document handle in an API parameter (or resource identifier) string used to download the document. The inline proxy interprets the document handle and the related metadata to analyze sensitivity of the document which is used to assign a sensitive classification to the document.

Consider that the cloud-based provider service is Salesforce.com™. The API string 348 comprises the URL of the cloud-based provider service 136. The inline proxy 171 performs deep API inspection of the API string 348. It identifies that the activity performed in the transaction 300 is a "download" of the enterprise document 368 from a Salesforce.com™ org. The inline proxy 171 extracts a document handle 378 "00P6000000t3hYa" for the enterprise document 368 from the API string 348. The inline proxy determines the document type of the enterprise document 368 as "attachment" from the object store 195 using a prefix of the document handle 378.

FIG. 3B illustrates the classification engine 181 using the lookup table 363 listing document handles of sensitive attachments. The document handle of the enterprise data document 368 is present in the lookup table (identified by a label 365). Therefore, the classification engine 181 assigns a sensitivity classification to the document 368. The classification engine does not rely on content inspection of the document for this sensitivity classification. Thus, reducing network latency and improving user experience. FIG. 3C shows that the document marker 191 embeds the sensitivity classification in the header metadata of the enterprise data document 368. The enterprise data document 368 is marked "Restricted" as indicated by the label 336. The document is then downloaded to the computer 121*a* of the enterprise user A.

Examples of Metadata Fields Extracted by Deep API Inspection (DAPII)

FIG. 4A illustrates a user interface 400A of the inline proxy 171 showing metadata fields extracted from the response message 300 from the cloud-based provider service. The metadata is organized in multiple categories including general 431, user 433, application 435, source 437, and destination 439. Each category includes a list of metadata fields and corresponding values. Some examples fields in each category are listed below.

General
Type
Alert Generated
Timestamp
Local Source Time
Access Method
Traffic Type
Browser Version
Browser Session Id
Page Site
Managed App
Transaction Id
Destination Timezone
Md5
Page Id
User
User
IP
Device
Operating System
Browser
Device Classification
Host Name
Operating System Version
User Key
Application
Application
Instance ID
URL
Cloud Confidence Level (CCL)
Cloud Confidence Index (CCI)
Activity
Page
Object
Object Id
Object Type
Telemetry App
AppSessionID
Referer
Category
Source
IP
Location
Region
Country
Zip
Latitude
Longitude
Timezone Destination
IP
Location
Region
Country
Zip
Latitude
Longitude The general category 431 includes metadata fields related to identification of the message in a transaction. The user category 433 includes metadata fields related to the enterprise user downloading a document from the cloud-based provider service 136 or uploading a document to a cloud-based storage service 159. The application category 435 includes metadata fields identifying details of the activity performed in the message (for example, download or upload), the document id (also referred to as object id 455) and the name (also referred to as object) of the document. The source 437 and destination 439 categories include metadata fields providing details about the user endpoint (source) and the server (destination) hosting the cloud-based provider service 136 or the cloud-based storage service 159.

Figure 4B:
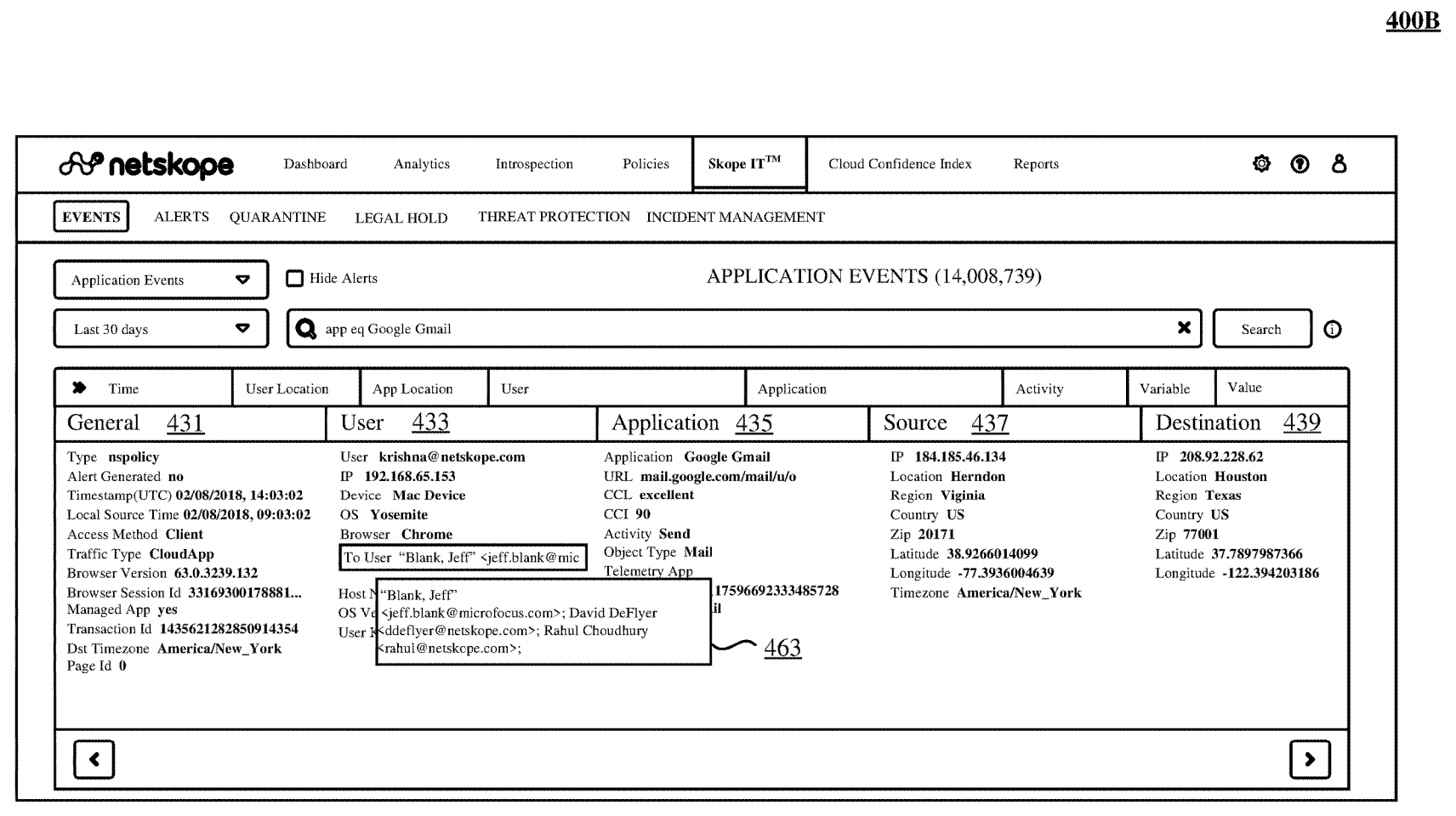

FIG. 4B illustrates a user interface 400B showing metadata fields extracted by the inline proxy 171 from an email message sent by a user via the endpoint. The email can contain sensitive data within a body of the email message or in document attached to the email message. The inline proxy 171 extracts the critical metadata including recipients' email addresses labelled as 463 in FIG. 4B. The classification engine 181 assigns the sensitivity classification to the document directly from the recipient email address using a white list of recipient domains. If domains of recipients' email addresses are present in the white list of recipient domains, the recipients can receive the attached documents. In one implementation, the classification engine compares the domain of recipients' email addresses to a black list of domains that are not allowed to receive sensitive documents. If the domains of recipients' email addresses are present in the black list of recipient domains, the classification engine assigns a sensitivity classification to the document attached to the email.

Figure 4C:
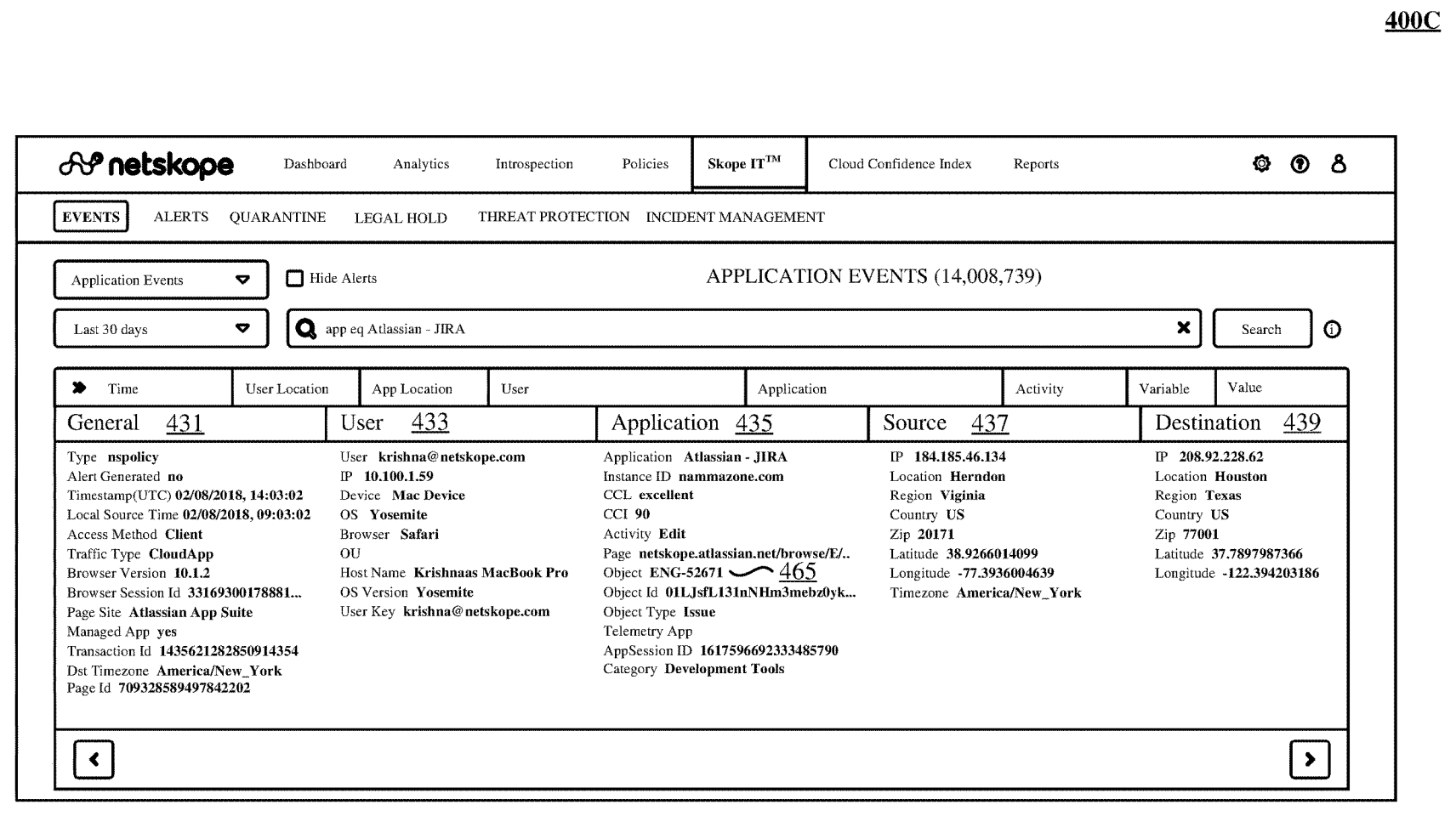

FIG. 4C illustrates a user interface 400C showing metadata fields extracted by the inline proxy 171 from a message in a transaction between a user endpoint and a cloud-based provider service 136 known as Atlassian JIRA™. This cloud-based service allows user to create and edit tickets for project and issue tracking. Separate modules are used to create tickets for separate departments in an organization. The example shows metadata extracted from a message in a transaction in which a user accesses a webpage presenting details of a ticket Atlassian JIRA™ In this example, the critical metadata includes a document handle "ENG-52671" labelled as 465. The document handle embeds a document type and a descriptive document name. In one implementation, the document type identifies a department of the organization. For example, ENG for engineering, OPS for operations, HR for human resources and FIN for finance department. Some document types are sensitive for example, human resources (HR) and finance (FIN). If the user requests to download a document from the issue web page, the classification engine 181 assigns a sensitivity classification to the document using the document type in the document handle.

Figure 4D:
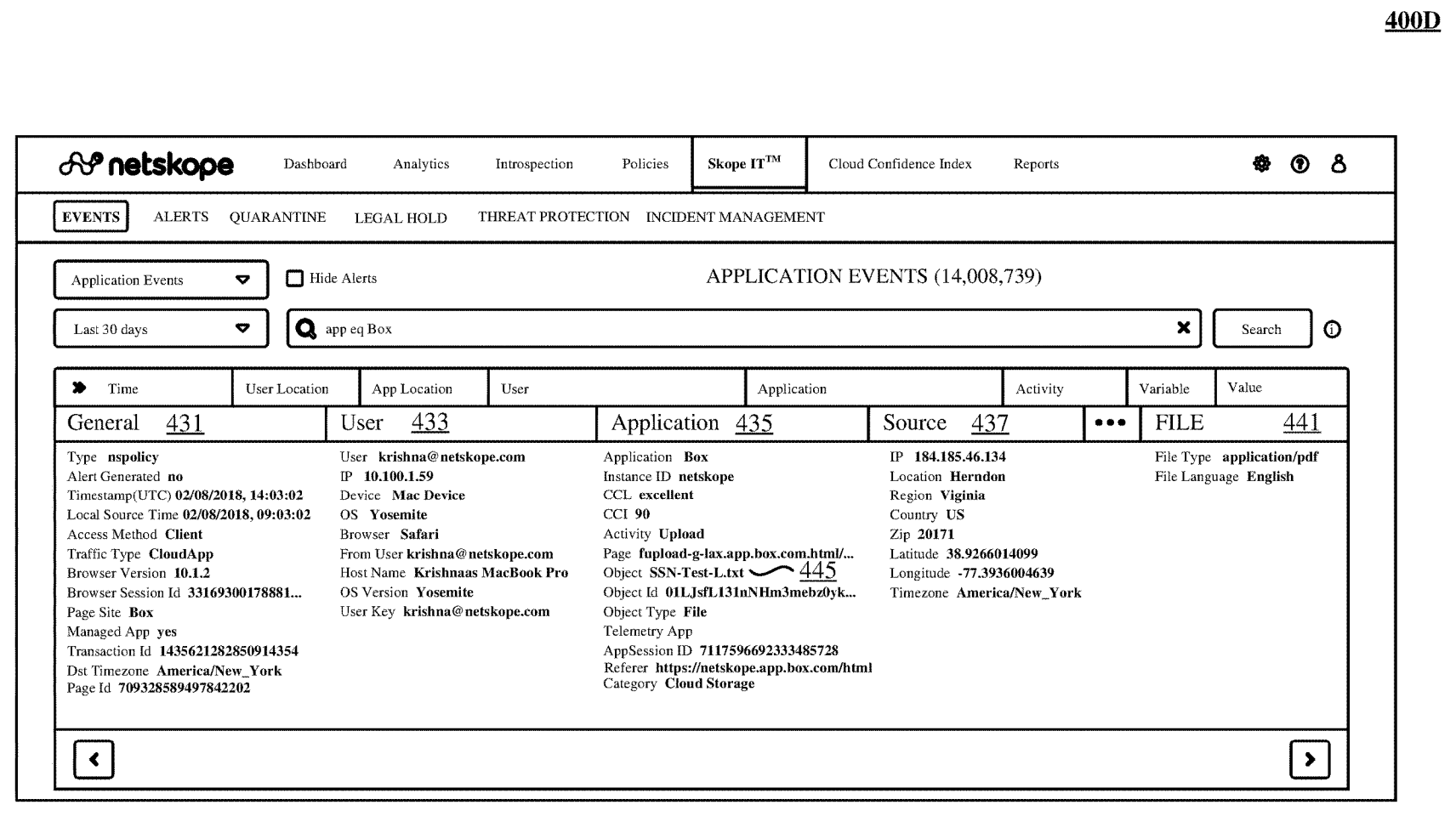

FIG. 4D illustrates a user interface 400D showing metadata fields extracted by the inline proxy 171 in a document upload activity to Box™ which is a cloud-based storage service. A metadata section labelled as file 441 indicates the true file type of the file being uploaded. The inline proxy 171 extracts the true file type and the file extension that represents the file type as indicated by the label 445. The classification engine 181 compares the true file type and the file extension the represents the file type. In the example, the inline proxy 171 identifies the true file type as "pdf". However, the file extension is "txt". The classification engine assigns a sensitive classification to the document as the true file type is different from the file extension.

The technology disclosed can use other metadata to identify and protect sensitive documents stored in cloud-based storage services. For example, Amazon™ Simple Storage Service (S3) stores data in buckets that can contain part of, one, or many documents. Each bucket is uniquely identified by a bucket name or other document handle. The name of the bucket is used as a document handle to protect sensitive data stored in an S3 bucket. When a user attempts to copy data from a source S3 bucket to a destination S3 bucket, the inline proxy 171 matches names of source and destination S3 buckets to a list of sensitive buckets. If the name of the source S3 bucket is matched to the sensitive list and the name of the destination bucket does not match, the inline proxy enforces the policy by blocking the copy of data. The technology disclosed efficiently enforces the policy by just using metadata without reliance on inspecting the contents being copied.

Sensitivity Classification of Document Embedded in Document Header

FIG. 5 shows sensitivity classification of the document embedded in the document header by the document marker 191. Different levels of classifications can be assigned sensitive documents, for example, restricted, secret, confidential, etc. In the example 500, the documents is classified as "restricted" labelled as 565.

Figure 6A:
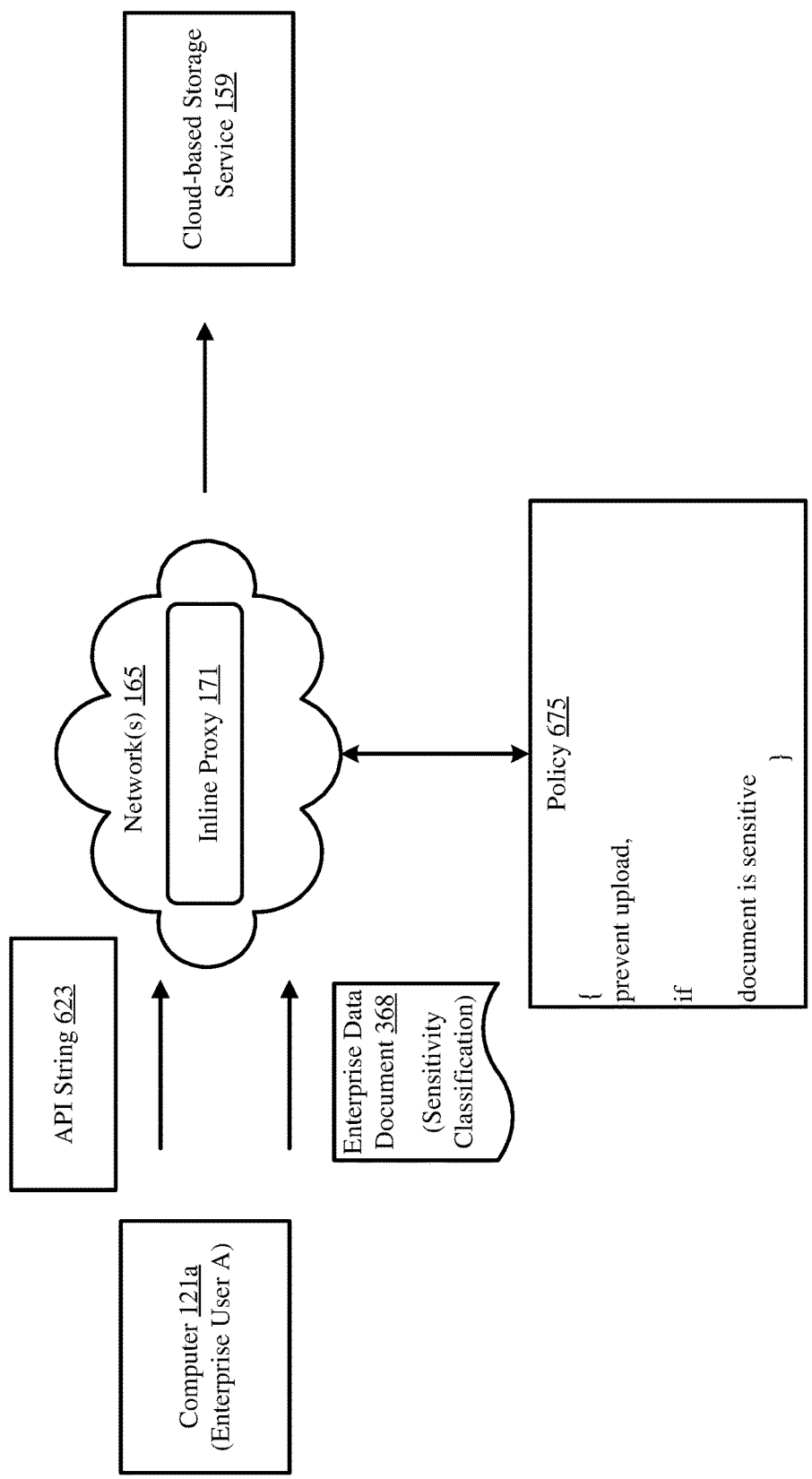
FIGS. 6A and 6B illustrate policy application to a sensitive document when an enterprise user attempts document upload to a cloud-based storage service.
Figure 6B:
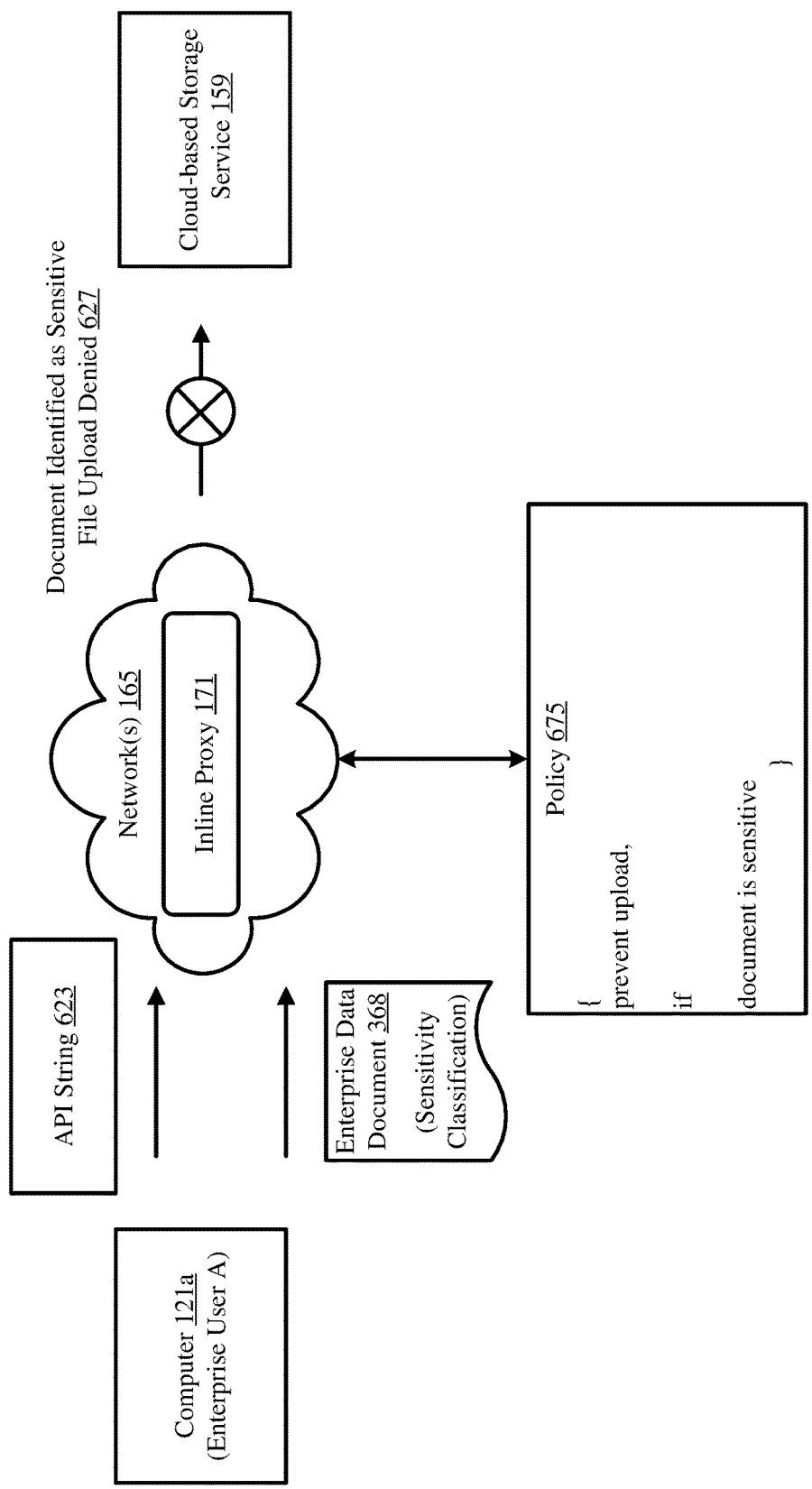

Having described the embedding of sensitive classification in document header, we now present policy enforcement using the sensitive classification. Performing sensitive classification of a document requires significant processing including extraction of metadata fields and using a document handle to identify whether the document is sensitive or not. If the sensitive classification of the document is embedded in the document header, an endpoint policy enforcer at the user endpoint can simply check the sensitive classification in the document header to enforce a data loss prevention (DLP) policy. Thus, saving processing time required to determine sensitivity classification of the document. Moreover, as the sensitive classification travels with the document, the network security system (NSS) 161 does not need to store the sensitive classification in a database for future reference. The NSS 161 can identify the sensitivity classification simply by checking the document header. FIGS. 6A and 6B present two use cases in which sensitive classification embedded in the document header is used to prevent exfiltration of a document.

Policy Enforcement to Prevent Data Exfiltration

FIG. 6A illustrates a message 600 in a transaction in which the enterprise user A (via computer 121a) attempts to upload the enterprise data document 368 to the cloud-based storage service 159. The inline proxy 171 parses the API string 623 and identifies an "upload" activity. The inline proxy 171 inspects the header metadata of the enterprise document 368 to identify sensitivity classification, previously embedded in the document header. The inline proxy 171 applies a security policy 675. The policy states that if a document is sensitive, the inline proxy 171 should not allow upload of the document to the cloud-based storage 159. FIG. 6B illustrates policy enforcement to prevent exfiltration of enterprise data document 368 with a marker identifying that the document is sensitive. The inline proxy 171 enforces the policy 675 and denies file upload 627 to the cloud-based storage service 159. Security policies can include other criteria to allow or block document uploads and downloads. For example, a policy can indicate that a sensitive document can only be uploaded to a sanctioned cloud-based storage service.

Figure 7:
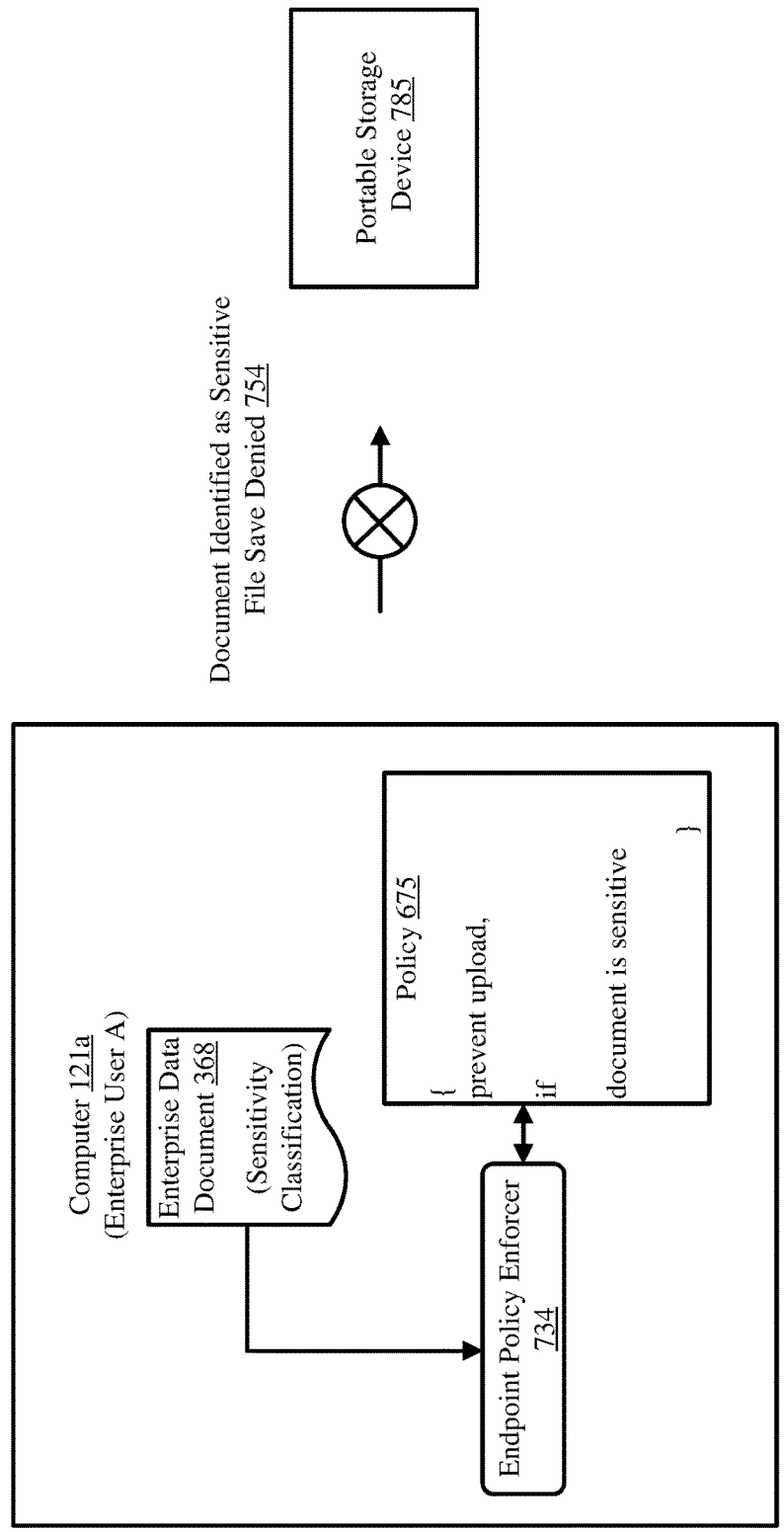
FIG. 7 illustrates policy application to a sensitive document when an enterprise user attempts saving a copy of the document to a portable storage device.

FIG. 7, referred by a numeral 700, presents policy enforcement to prevent data exfiltration when the enterprise user A attempts to copy the enterprise data document 368 to a portable storage device 785. An endpoint policy enforcer 734 residing on the endpoint (computer 121a) of the enterprise user A enforces the policy 675. The header of the enterprise data document 368 includes a marker identifying the document as sensitive. The endpoint policy enforcer 734 enforces the policy 675 and denies file save 754 to the portable storage device 785. Embedding sensitivity classification of the enterprise document in the header of the enterprise document saves processing time required at the user endpoint to perform such sensitivity classification.

Security policies can also include for examples described in FIGS. 4B, 4C and 4D. For example, in the case of emails, blocking emails, with sensitive documents attached, to recipients having domains in the black list of recipient domains. In the example of project and issue tracking system, restricting download of documents with document type "HR" or "FIN". Finally, in the case of a document upload or download activity, blocking the activity if there is a mismatch between the true file type and the file extension that represents the file type.

In one implementation, the inline proxy 171 determines that a destination of the document generated is an unmanaged endpoint. As used herein, an "unmanaged endpoint" is referred to as a Bring Your Own Device (BYOD) and/or an off-network device whose traffic is not being tunneled through a policy enforcing server. The document is assigned a sensitivity classification from the unmanaged status of the destination without reliance on inspecting contents within a body of the document.

FIG. 8 illustrates of a computer program code of a traffic parser 255. The code is implemented as an API connector. The example code is a portion of the Salesforce.com™ API connector. The connector parses the user's network traffic and extracts metadata as shown in FIG. 4A. The objectid is identified in the resource string. The value of the objectid is stored in a system variable "object_id" 815. Request and response parts of the message are parsed by portions of the code 841 and 871, respectively. The request portion identifies the document requested by the user as a "file" 837 and saves it in the "object_type" system variable 834. In the response part of the code, the activity is determined as "download" 866. The metadata shown in FIG. 4A for the Salesforce.com™ example is extracted by the API connector 800. A small portion of the Salesforce.com™ API connector's code is shown in FIG. 8 for illustration purposes.

Computer System

Figure 9:
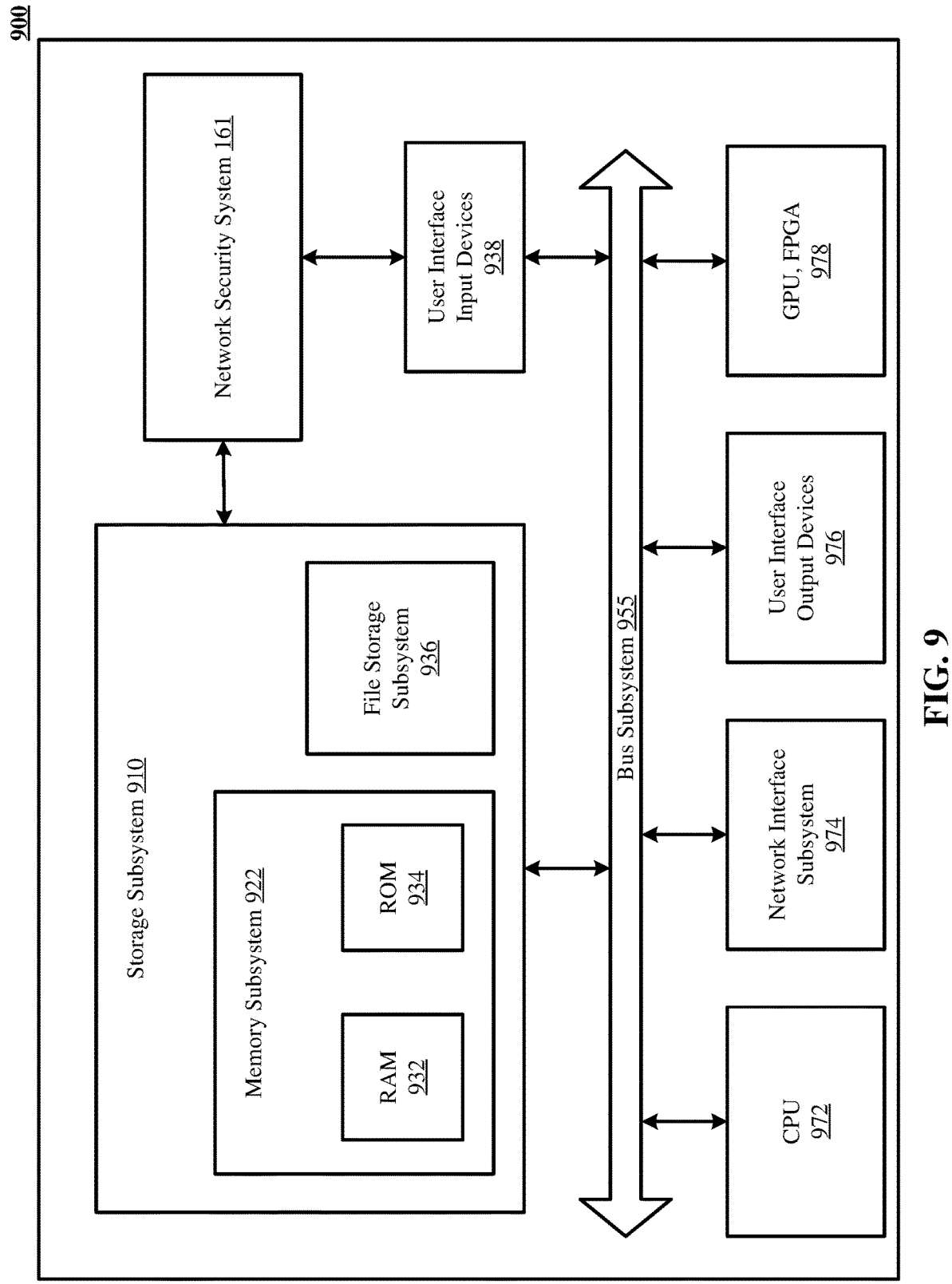
FIG. 9 is a simplified block diagram of a computer system that can be used to implement the technology disclosed.

FIG. 9 is a simplified block diagram of a computer system 900 that can be used to implement the network security system 161 of FIG. 1 for sensitivity classification of documents generated by and downloaded from cloud-based provider services. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems.

In one implementation, the network security system 161 of FIG. 1 is communicatively linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

Particular Implementations

The technology disclosed relates to efficiently classifying sensitivity of document generated by and downloaded from cloud-based provider services.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to efficiently classify sensitivity of document generated by and downloaded from cloud-based provider services. The system monitors a user's network traffic at an endpoint that initiates generation of the document and receives a web page identifying the document generated. Following this, the system parses the user's network traffic that selects the document for download. The system intercepts from the parsed traffic, a critical metadata in an API parameter (or resource identifier) string used to download the document. Finally, the system interprets the critical metadata to analyze sensitivity of the document to assign a sensitive classification to the document. Data exfiltration prevention measures can be triggered upon detection of attempted exfiltration of the document based on the sensitivity classification.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The critical metadata includes a document handle that embeds a document type. The system assigns the sensitivity classification to the document directly from the document type extracted from the document handle. The system assigs this sensitivity classification to the document without inspecting contents within a body of the document.

The critical metadata includes a document handle for at least one document. The system assigns the sensitivity classification to the document directly the document handle using a lookup table, without reliance on inspecting contents within a body of the document.

The critical metadata includes a recipient email address. The system assigns the sensitivity classification to the document directly from the recipient email address using a white list of recipient domains. The system assigns the sensitivity classification to the document without reliance on inspecting contents within a body of the document.

The critical metadata includes a recipient email address. The system assigns the sensitivity classification to the document directly from the recipient email address using a black list of recipient domains. The system assigns the sensitivity classification to the document without reliance on inspecting contents within a body of the document.

The critical metadata includes a true file type and a file extension that represents the file type. The system assigns the sensitivity classification to the document directly from mismatch between the true file type and the file extension that represents the file type. The system assigns the sensitivity classification to the document without reliance on inspecting contents within a body of the document.

The critical metadata includes a document handle that embeds a document type and a descriptive document name. The system assigns the sensitivity classification to the document directly from the document type extracted from the document handle and at least part of the descriptive document name. The system assigns the sensitivity classification to the document without reliance on inspecting contents within a body of the document.

The system embeds the sensitivity classification in header metadata of the document. The system inspects the header metadata of the document for the embedded sensitivity classification when transferring the document from the endpoint being monitored to a storage location away from the endpoint that is not being monitored. The transferring of the document includes copying the document on a portable storage medium.

The system calculates a document hash of a watermark extracted from the document. Following this, the system compares the calculated hash with a list of sensitive hashes provided by the cloud-based provider service to generate the sensitivity classification of the document.

The system determines that a destination of the document generated is an unmanaged endpoint. The system assigns the sensitivity classification to the document directly from the unmanaged endpoint status of the destination, without reliance on inspecting contents within a body of the document.

The document handle is a concatenated key with a source object type part of the key and an object identifier part of the key that is at least locally unique for the source object type.

Other implementations may include a non-transitory computer readable storage medium storing instructions executable by a processor to perform functions of the system described above. Yet another implementation may include a method performing the functions of the system described above.

A method implementation of the technology disclosed includes efficiently classifying sensitivity of document generated by and downloaded from cloud-based provider services. The method includes monitoring a user's network traffic at an endpoint that initiates generation of the document and receives a web page identifying the document generated. Following this, the method includes parsing the user's network traffic that selects the document for download. The method includes intercepting from the parsed traffic, a critical metadata in an API parameter (or resource identifier) string used to download the document. Finally, the method includes interpreting the critical metadata to analyze sensitivity of the document to assign a sensitive classification to the document. Data exfiltration prevention measures can be triggered upon detection of attempted exfiltration of the document based on the sensitivity classification.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

What is claimed is:

1. A method of efficiently classifying, using a document handle generated by cloud-based provider services to encode, from a document type as opposed to a file type, sensitivity of a document generated by and downloaded from the cloud-based provider services, to save analysis time during later Data Loss Prevention (DLP) analysis to prevent exfiltration and including actions of:
   monitoring network traffic using an inline proxy that is independent and not provided by a cloud-based provider of service, wherein the traffic includes a web page, the web page including:
      a link for a user to select to download the document generated by the cloud-based services,
      a domain name, and
      an API parameter string that includes the document handle;
   using the domain name to select a parser adapted for the cloud-service provider;
   the parser parsing the network traffic, generated in response to a user selecting the link requesting the download of the document, to identify the document handle from the API parameter string;
   determining a sensitivity classification from the identified document handle; and
   encoding the determined sensitivity classification into header metadata that is part of the document,
      whereby the encoded sensitivity classification travels with the document and enables exfiltration policy enforcement in a way that saves enforcement processing time, based on acquiring the encoded sensitivity classification from the document header metadata.

2. The method of claim 1 further including assigning the sensitivity classification to the document directly from a document type extracted from the document handle, without reliance on inspecting contents within a body of the document.

3. The method of claim 1 further including assigning the sensitivity classification to the document directly from the document handle using a lookup table, without reliance on inspecting contents within a body of the document.

4. The method of claim 1:
   wherein the header metadata includes a descriptive document name; and
   further including assigning the sensitivity classification to the document directly from a document type extracted from the document handle and at least part of the descriptive document name, without reliance on inspecting contents within a body of the document.

5. The method of claim 1, further including inspecting the header metadata of the document for the encoded sensitivity classification when transferring the document from an endpoint being monitored to a storage location away from an endpoint that is not being monitored.

6. The method of claim 5, wherein the transferring the document includes copying the document on a portable storage medium.

7. A proxy system positioned on a network separate from a user and a cloud-based provider including one or more processors coupled to memory, the memory loaded with computer instructions to efficiently classify, using a document handle generated by cloud-based provider services to encode, from a document type as opposed to a file type, sensitivity of documents generated by and downloaded from the cloud-based provider services to save analysis time during later Data Loss Prevention (DLP) analysis to prevent exfiltration, the instructions, when executed on the processors, implement actions comprising:
   monitoring network traffic using an inline proxy that is independent and not provided by a cloud-based provider of service, wherein the traffic includes a web page, the web page including:
      a link for a user to select to download the document generated by the cloud-based services,
      a domain name, and
      an API parameter string that includes the document handle;
   using the domain name to select a parser adapted for the cloud-service provider;
   the parser parsing the network traffic, generated in response to a user selecting the link requesting the download of the document, to identify the document handle from the API parameter string;
   determining a sensitivity classification from the identified document handle; and
   encoding the determined sensitivity classification into header metadata that is part of the document,
      whereby the encoded sensitivity classification travels with the document and enables exfiltration policy enforcement in a way that saves enforcement processing time, based on acquiring the encoded sensitivity classification from the document header metadata.

8. The system of claim 7, further including assigning the sensitivity classification to the document directly from a document type extracted from the document handle, without reliance on inspecting contents within a body of the document.

9. The system of claim 8, further including assigning the sensitivity classification to the document directly from the document handle using a lookup table, without reliance on inspecting contents within a body of the document.

10. The system of claim 7:
    wherein the header metadata includes a descriptive document name; and
    further including assigning the sensitivity classification to the document directly from a document type extracted from the document handle and at least part of the descriptive document name, without reliance on inspecting contents within a body of the document.

11. The system of claim 7, further including inspecting the header metadata of the document for the encoded sensitivity classification when transferring the document from an endpoint being monitored to a storage location away from an endpoint that is not being monitored.

12. The system of claim 11, wherein the transferring the document includes copying the document on a portable storage medium.

13. A non-transitory computer readable storage medium impressed with computer program instructions to efficiently classify, using a document handle generated by cloud-based provider services to encode, from a document type as opposed to a file type, sensitivity of documents generated by and downloaded from the cloud-based provider services to save analysis time during later Data Loss Prevention (DLP) analysis to prevent exfiltration, the instructions, when executed on a processor of a proxy positioned on a network separate from a user and the cloud-based provider, implement a method comprising:
monitoring network traffic using an inline proxy that is independent and not provided by a cloud-based provider of service, wherein the traffic includes a web page, the web page including:
a link for a user to select to download the document generated by the cloud-based services,
a domain name, and
an API parameter string that includes the document handle;
using the domain name to select a parser adapted for the cloud-service provider;
the parser parsing the network traffic, generated in response to a user selecting the link requesting the download of the document, to identify the document handle from the API parameter string;
determining a sensitivity classification from the identified document handle; and
encoding the determined sensitivity classification into header metadata that is part of the document,
whereby the encoded sensitivity classification travels with the document and enables exfiltration policy enforcement in a way that saves enforcement processing time, based on acquiring the encoded sensitivity classification from the document header metadata.

14. The non-transitory computer readable storage medium of claim 13, further including assigning the sensitivity classification to the document directly from a document type extracted from a document handle, without reliance on inspecting contents within a body of the document.

15. The non-transitory computer readable storage medium of claim 14, further including assigning the sensitivity classification to the document directly from the document handle using a lookup table, without reliance on inspecting contents within a body of the document.

16. The non-transitory computer readable storage medium of claim 13:
wherein the header metadata includes a descriptive document name; and
further including assigning the sensitivity classification to the document directly from a document type extracted from the document handle and at least part of the descriptive document name, without reliance on inspecting contents within a body of the document.

17. The non-transitory computer readable storage medium of claim 13, further including inspecting the header metadata of the document for the encoded sensitivity classification when transferring the document from an endpoint being monitored to a storage location away from an endpoint that is not being monitored.

18. The non-transitory computer readable storage medium of claim 17, wherein the transferring the document includes copying the document on a portable storage medium.

19. The non-transitory computer readable storage medium of claim 13, wherein the parsed network traffic was generated, at least in part, in response to a user selecting the link requesting the download of the document.

20. A method of efficiently pre-classifying, using a file handle generated by a cloud-based provider service to encode, from a document type as opposed to a file type, sensitivity of a file downloaded from the cloud-based provider service, to save analysis time during later Data Loss Prevention (DLP) analysis to prevent exfiltration and including actions of:
monitoring network traffic using an inline proxy that is independent and not provided by a cloud-based provider of service, wherein the traffic includes a web page, the web page including:
a link for a user to select to download a file generated by the cloud-based provider of services,
a domain name, and
an API parameter string that includes the file handle;
using the domain name to select a parser adapted for the cloud-service provider;
parsing the network traffic, generated in response to a user selecting the link requesting the download of the file, to identify the file handle from the API parameter string;
encoding the determined sensitivity classification into header metadata that is part of the file,
whereby the encoded sensitivity classification travels with the file and enables exfiltration policy enforcement in a way that saves enforcement processing time, based on acquiring the encoded sensitivity classification from the file header metadata.

21. A non-transitory computer readable storage medium impressed with computer program instructions to efficiently classify, using a file handle generated by cloud-based provider services to encode, from a document type as opposed to a file type, sensitivity of files generated by and downloaded from the cloud-based provider services to save analysis time during later Data Loss Prevention (DLP) analysis to prevent exfiltration, the instructions, when executed on a processor of a proxy positioned on a network separate from a user and the cloud-based provider, implement a method comprising the steps of claim 20.

22. A proxy system positioned on a network separate from a user and a cloud-based provider including one or more processors coupled to, the non-transitory computer readable storage medium of claim 21 loaded with computer instructions to efficiently classify, using a file handle generated by the cloud-based provider services to encode, from a document type as opposed to a file type, sensitivity of files generated by and downloaded from cloud-based provider services to save analysis time during later Data Loss Prevention (DLP) analysis to prevent exfiltration, the instructions, when executed on the processors, implement actions.

* * * * *